US008812190B2

(12) United States Patent
Hisatsugu et al.

(10) Patent No.: US 8,812,190 B2
(45) Date of Patent: Aug. 19, 2014

(54) VEHICULAR INPUT MANIPULATION APPARATUS

(75) Inventors: Shinsuke Hisatsugu, Kariya (JP);
Yasuhiko Yamazaki, Nagoya (JP);
Masaharu Kinoshita, Kariya (JP);
Hiroaki Ichihara, Konan (JP)

(73) Assignees: Denso Corporation, Kariya (JP);
Toyota Shatai Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 563 days.

(21) Appl. No.: 13/202,033

(22) PCT Filed: Apr. 15, 2010

(86) PCT No.: PCT/JP2010/057189
§ 371 (c)(1),
(2), (4) Date: Aug. 17, 2011

(87) PCT Pub. No.: WO2010/123084
PCT Pub. Date: Oct. 28, 2010

(65) Prior Publication Data
US 2011/0301810 A1    Dec. 8, 2011

(30) Foreign Application Priority Data

Apr. 24, 2009    (JP) ................................. 2009-106807

(51) Int. Cl.
*G06F 7/00*    (2006.01)
(52) U.S. Cl.
USPC .......................................................... 701/36
(58) Field of Classification Search
USPC .......................................... 701/36; 345/156
See application file for complete search history.

(56) References Cited

U.S. PATENT DOCUMENTS 5,230,467 A    7/1993    Kubsch et al.
6,115,657 A    9/2000    Petit
(Continued)

FOREIGN PATENT DOCUMENTS

DE    4041193    7/1992
DE    19808510    11/1998
(Continued)

OTHER PUBLICATIONS

International Search Report and Written Opinion of the ISA for PCT/JP2010/057189, ISA/EP, Rijswijk, NL, mailed Aug. 5, 2010.
(Continued)

*Primary Examiner* — Kim T Nguyen
(74) *Attorney, Agent, or Firm* — Harness, Dickey & Pierce, P.L.C.

(57) ABSTRACT

A vehicular input manipulation apparatus has a target parameter switchover manipulating device and a setup changeover manipulating device in order to change setup contents of several control parameters for drive control of an in-vehicle apparatus. The target parameter switchover manipulating device executes switchover to designate one of the control parameters as a change target control parameter. The setup changeover manipulating device changes a setup content relative to the change target control parameter. When a control mode of the in-vehicle apparatus is changed into a predetermined control mode, a control circuit automatically enforces switchover relative to the change target control parameter by automatically replacing the control parameter, which has been designated as the change target control parameter, with an enforcement change target control parameter, which is a predetermined control parameter associated with the predetermined control mode.

28 Claims, 26 Drawing Sheets

(56) References Cited

U.S. PATENT DOCUMENTS

| | | |
|---|---|---|
| 6,903,652 B2 | 6/2005 | Noguchi et al. |
| 2001/0050693 A1* | 12/2001 | Nishiyama et al. ........... 345/811 |
| 2008/0088577 A1* | 4/2008 | Lenneman et al. ........... 345/156 |
| 2010/0079415 A1* | 4/2010 | Yang ............................. 345/184 |

FOREIGN PATENT DOCUMENTS

| | | |
|---|---|---|
| EP | 1502835 | 2/2005 |
| GB | 2441340 | 3/2008 |
| JP | 63-053105 | 3/1988 |
| JP | 04-015120 | 1/1992 |
| JP | 07-172145 | 7/1995 |
| JP | 2001-350570 A | 12/2001 |
| JP | 2003-327059 A | 11/2003 |
| JP | 2005-302653 A | 10/2005 |
| JP | 2006-079407 | 3/2006 |
| JP | 2006-264636 A | 10/2006 |
| JP | 2007-320521 A | 12/2007 |
| JP | 2008-299242 | 12/2008 |
| JP | 2009-255831 | 11/2009 |

OTHER PUBLICATIONS

Office Action issued Apr. 24, 2013 in corresponding German Application No. 112010001722.0 (with English translation).

* cited by examiner

<"AUTO AIR-CON" AT "FAN" STATE>

(1) AT "FAN" STATE (2) MANIPULATE "AUTO"

[AUTO MOVE TO "T ADJUST" STATE]

(3) MANIPULATE "NUMERAL ADJUST"

<"AUTO AIR-CON" AT "T ADJUST" STATE>

(1) AT "T ADJUST" STATE (2) MANIPULATE "AUTO"

(3) MANIPULATE "NUMERAL ADJUST"

<"AUTO AIR-CON" AT "MODE" STATE>

(1) AT "MODE" SELECTED (2) MANIPULATE "AUTO"

[AUTO MOVE TO "T ADJUST" STATE]

(3) MANIPULATE "NUMERAL ADJUST"

<"OFF AIR-CON" AT "FAN" STATE>

(1) AT "FAN" STATE (2) MANIPULATE "OFF"

(3) MANIPULATE "NUMERAL ADJUST"

<"OFF AIR-CON" AT "T ADJUST" STATE>

(1) AT "T ADJUST" STATE (2) MANIPULATE "OFF"

[AUTO MOVE TO "FAN" STATE]

(3) MANIPULATE "NUMERAL ADJUST"

<"OFF AIR-CON" AT "MODE" STATE>

(1) AT "MODE" STATE (2) MANIPULATE "OFF"

[AUTO MOVE TO "FAN" STATE]

(3) MANIPULATE "NUMERAL ADJUST"

<"AUTO AIR-CON" AT "FAN" STATE>

(1) AT "FAN" STATE (2) MANIPULATE "AUTO"

(3) MANIPULATE "NUMERAL ADJUST"

<"AUTO AIR-CON" AT "T ADJUST" STATE>

(1) AT "T ADJUST" STATE (2) MANIPULATE "AUTO"

(3) MANIPULATE "NUMERAL ADJUST"

<"AUTO AIR-CON" AT "MODE" STATE>

(1) AT "MODE" STATE (2) MANIPULATE "AUTO"

(3) MANIPULATE "NUMERAL ADJUST"

<"AUTO AIR-CON" AT "FAN" STATE>

(1) AT "FAN" STATE (2) MANIPULATE "AUTO"

(3) MANIPULATE "FUNCTION SELECT"
(SELECT "T ADJUST")

(4) MANIPULATE "NUMERAL ADJUST"

<"AUTO AIR-CON" AT "T ADJUST" STATE>

(1) AT "T ADJUST" STATE (2) MANIPULATE "AUTO"

(3) MANIPULATE "NUMERAL ADJUST"

<"AUTO AIR-CON" AT "MODE" STATE>

(1) AT "MODE" STATE (2) MANIPULATE "AUTO"

(3) MANIPULATE "FUNCTION SELECT"
    (SELECT "T ADJUST")

(4) MANIPULATE "NUMERAL ADJUST"

<"OFF AIR-CON" AT "FAN" STATE>

(1) AT "FAN" STATE

⇩

(2) MANIPULATE "OFF"

⇩

(3) MANIPULATE "NUMERAL ADJUST"

<"OFF AIR-CON" AT "T ADJUST" STATE>

(1) AT "T ADJUST" STATE (2) MANIPULATE "OFF"

(3) MANIPULATE "NUMERAL ADJUST"

<"OFF AIR-CON" AT "MODE" STATE>

(1) AT "MODE" STATE (2) MANIPULATE "OFF"

(3) MANIPULATE "NUMERAL ADJUST"

<"OFF AIR-CON" AT "FAN" STATE>

(1) AT "FAN" STATE

⇩

(2) MANIPULATE "OFF"

⇩

(3) MANIPULATE "NUMERAL ADJUST"

<"OFF AIR-CON" AT "T ADJUST" STATE>

(1) AT "T ADJUST" STATE (2) MANIPULATE "OFF"

(3) MANIPULATE "FUNCTION SELECT" (SELECT "FAN")

(4) MANIPULATE "NUMERAL ADJUST"

<"OFF AIR-CON" AT "MODE" STATE>

(1) AT "MODE" STATE (2) MANIPULATE "OFF"

(3) MANIPULATE "FUNCTION SELECT"
    (SELECT "FAN")

(4) MANIPULATE "NUMERAL ADJUST"

VEHICULAR INPUT MANIPULATION APPARATUS

CROSS-REFERENCE TO RELATED APPLICATIONS

This application is a 371 U.S. National Stage of International Application No. PCT/JP2010/057189, filed Apr. 15, 2010, which is based on and incorporates herein by reference Japanese Patent Application No. 2009-106807, filed Apr. 24, 2009.

TECHNICAL FIELD

The present invention relates to a vehicular input manipulation apparatus.

BACKGROUND ART

[Patent document 1] JP-2005-302653 A

A vehicle such as an automotive has an input manipulation unit or apparatus for operating an in-vehicle electronic apparatus such as an air-conditioning apparatus, a car audio system, and a navigation apparatus; the input manipulation apparatus is arranged in an instrument panel of the compartment of the vehicle, for instance. Such an input manipulation apparatus has been recently multi-functionalized such that various instruction inputs are performed using the smaller number of manipulating devices. A typical configuration of the input manipulation apparatus has two types of manipulating devices. The first manipulating device is used for selecting or designating one of operation kinds (i.e., candidate control parameters) as a change target control parameter; in contrast, the second is used for executing a detailed setup of the designated change target control parameter. In such a configuration, the number of instruction inputs can be varied depending on the number of candidate control parameters of the first manipulating device for selecting the change target control parameter. The number of instruction inputs can be thus not less than the small number of manipulating devices.

However, the foregoing configuration of the input manipulation apparatus poses the following issues. That is, any instruction input for an intended control parameter cannot be made until the intended control parameter is selected among the candidate control parameters using the first manipulating device. That is, in order to execute an instruction input for a certain control parameter, two step manipulating actions are necessary. This involves a disadvantage in manipulation performance or manipulability.

Patent document 1 discloses an input manipulation apparatus needing the above two step manipulating actions. In particular, a dial manipulating device is provided to be arranged in a central bottom of a manipulation panel while having a dial knob (i.e., dial handle) for an in-vehicle air-conditioning apparatus, so as to enable not only a rotation manipulation (i.e., a rotation manipulating action) but also a tilt manipulation (i.e., a tilt manipulating action). The tilt manipulating action allows a control parameters selection with respect to air-conditioning to select one of control parameters that include a blowoff air temperature setup parameter, a blowoff air quantity setup parameter, and a blowoff air outlet setup parameter. The rotation manipulating action allows a specific adjustment to adjust a setup content (or to select one of setup specifics of the setup content) of the control parameter selected via the tilt manipulating action.

However, the foregoing input manipulation apparatus has an inconvenient feature due to the two steps manipulating actions. For example, the following exemplifies a case that an in-vehicle air-conditioning apparatus, which is presently in an OFF state, is caused to return into an ON state (i.e., drive state). With respect to a usual input manipulation apparatus for an in-vehicle air-conditioning apparatus, a setup button is independently arranged for serving as not only designating a blowoff air quantity but also canceling the OFF mode; thus, one time manipulating action or instruction input is only necessary for the air-conditioning apparatus to return into the drive state. In contrast, with respect to the input manipulation apparatus of Patent document 1, a tilt manipulating action is first necessary for selecting a control parameter of the blowoff air quantity before executing a dial manipulating action for returning into the drive state.

In addition, the input manipulation apparatus of Patent document 1 has a disadvantage of causing an operational mistake. That is, a usual in-vehicle air-conditioning apparatus has an automatic mode in which a predetermined automatic calculation is made for adjusting a blowoff air quantity or setup of a blowoff air outlet using a setup value of the blowoff air temperature or a detection result of an air-conditioning apparatus sensor. In such an automatic mode, if an instruction input is made for changing the blowoff air quantity or the setup of the blowoff air outlet during the automatic mode being selected, the selected automatic mode is then canceled; thereby, the mode returns to the manual mode. In the input manipulation apparatus of Patent document 1, in case that a control parameter other than the blowoff air temperature setup is maintained selected as the result of the previous tilt manipulating action while the automatic mode is being selected, any slightly angled rotation manipulating action, which may be made even mistakenly, results in causing the blowoff air quantity or the setup of the blowoff air outlet to undesirably change. In conjunction, the automatic mode is unintentionally canceled.

DISCLOSURE OF THE INVENTION

The present invention is made in view of the above issues. It is an object of the present invention to provide a vehicular input manipulation apparatus enabling various instruction inputs via fewer manipulating actions and maintaining suitable manipulability while helping prevent a mistake in manipulating actions.

To achieve the above object, according to an example of the present invention, a vehicular input manipulation apparatus is provided in a vehicle for changing a setup content of one of a plurality of control parameters for driving an in-vehicle apparatus. The input manipulating apparatus is provided as follows. A target parameter switchover manipulating device is included to execute switchover to designate one of the control parameters of the in-vehicle apparatus as a change target control parameter whose setup content is to be changed. A setup changeover manipulating device is included to change the setup content of the change target control parameter. A mode switchover manipulating device is included to execute switchover to designate, as a target control mode of the in-vehicle apparatus, a predetermined control mode included in a plurality of control modes. A target parameter enforcement switching section is configured to enforce switchover relative to the change target control parameter by automatically replacing the control parameter, which has been designated as the change target control parameter, with an enforcement change target control parameter at a time when the predetermined control mode is designated as the target control mode.

Herein, the enforcement change target control parameter is a predetermined control parameter associated with the predetermined control mode.

Incidentally, there is a conventional vehicular input manipulation apparatus also includes two manipulating devices of (i) a change target switchover manipulating device to designate or select one of control parameters (i.e., control information items) as a change target control parameter from among several candidate control parameters in the in-vehicle apparatus, and device, and (ii) a setup changeover manipulating device to change a setup content of the designated change target control parameter.

In such a conventional input manipulation apparatus, even if a control mode of the in-vehicle apparatus is changed to a predetermined control mode, the control parameter defined as a change target control parameter is kept unchanged as it is.

In contrast, according to a configuration of the above example of the present invention, when the control mode of the in-vehicle apparatus is changed to the predetermined control mode, the control parameter being presently designated as the change target is forcibly changed to or replaced with a predetermined enforcement change target control parameter even though the target parameter switchover manipulating device is not manipulated.

Thus, the enforcement change target control parameter may be assigned to a control parameter whose setup content tends to be changed highly frequently by a user in the predetermined control mode being designated. Thereby, after changing to the predetermined control mode, the setup content of the control parameter manipulated highly frequently can be changed immediately using the setup changeover manipulating device.

As a result, two step manipulating actions of a parameter designation and a setup change are unnecessary for the manipulation or instruction input having a large number of repetition times (i.e., high manipulation frequency).

In addition, the change target control parameter is forcibly assigned to the control parameter with the high manipulation frequency of the user. Such a configuration can help prevent occurrence of user's mis-manipulation such as changing to the control parameter with a lower manipulation frequency or canceling the control mode being presently designated unintentionally.

According to another example of the present invention, a method used in a vehicular input manipulating apparatus is provided for changing a setup content of one of a plurality of control parameters for driving an in-vehicle apparatus. The method comprises: (i) executing switchover to designate one of the control parameters of the in-vehicle apparatus as a change target control parameter whose setup content is to be changed; (ii) executing switchover to designate, as a target control mode of the in-vehicle apparatus, one of a plurality of control modes; (iii) determining whether the designated target control mode is a predetermined control mode of the in-vehicle apparatus; and (iv) enforcing switchover relative to the change target control parameter at a time when the control mode designated as the target control mode is determined to be the predetermined control mode, by automatically replacing the control parameter, which has been designated as the change target control parameter, with an enforcement change target control parameter, the enforcement change target control parameter being a predetermined control parameter associated with the predetermined control mode.

BRIEF DESCRIPTION OF THE DRAWINGS

The above and other objects, features, and advantages of the present invention will become more apparent from the following detailed description made with reference to the accompanying drawings. In the drawings.

BEST MODES FOR CARRYING OUT THE INVENTION

Hereinafter, a vehicular input manipulation apparatus according to an embodiment of the present invention is described with reference to the drawings.

Figure 1:
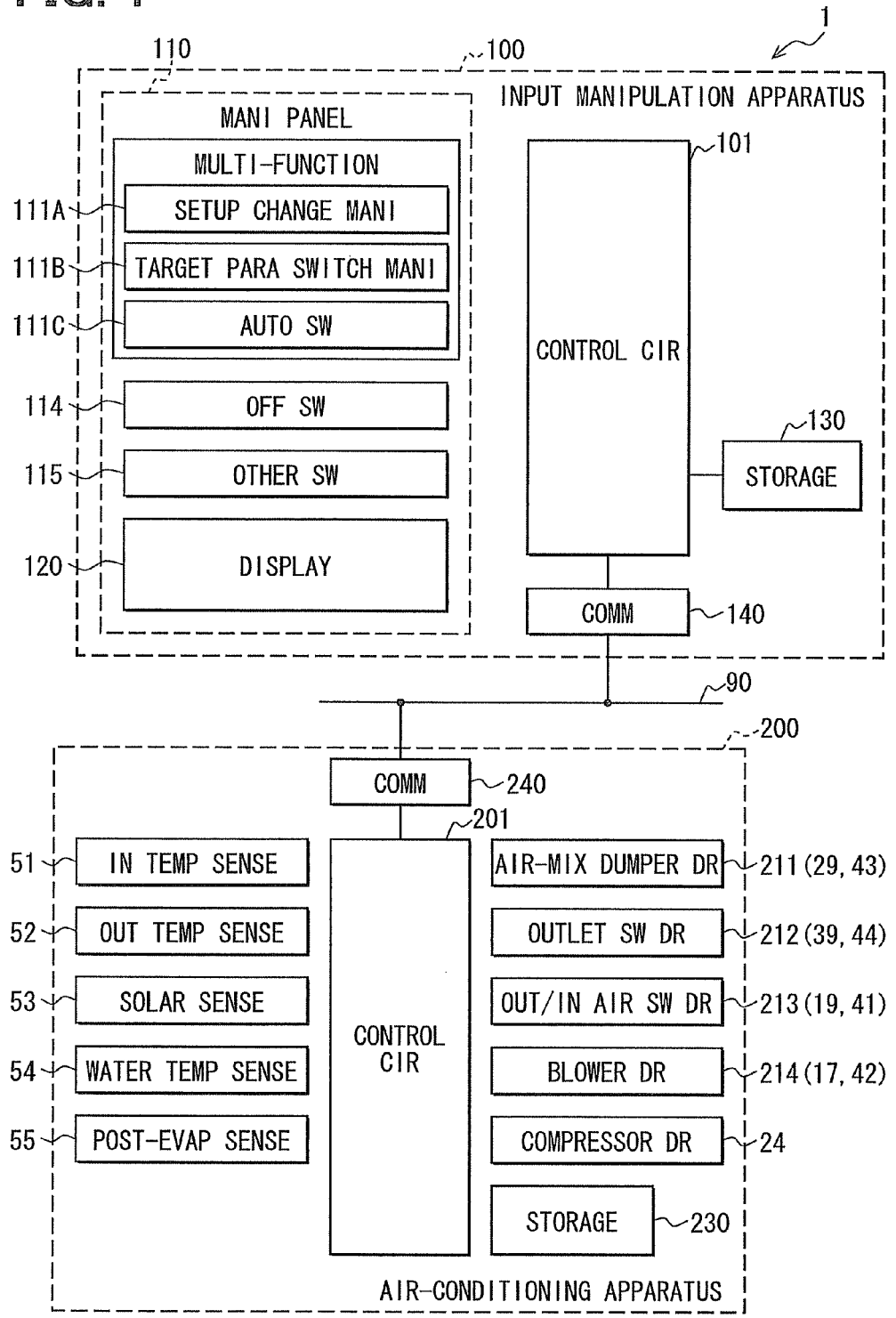
FIG. 1 is a block diagram illustrating a configuration of an air-conditioning system for a vehicle equipped with an input manipulation apparatus according to an embodiment of the present invention.

FIG. 1 illustrates a schematic configuration of a vehicular air-conditioning system using an input manipulation apparatus according to an embodiment of the present invention. The vehicular air-conditioning system 1 in FIG. 1 includes an air-conditioning apparatus 200 (also referred to as an in-vehicle apparatus) and an input manipulation apparatus 100, both of which communicate with each other.

The input manipulation apparatus 100 includes a control circuit 101 and a manipulation panel 110. The control circuit 101 includes a known microcomputer containing a CPU, ROM, and RAM while executing various programs stored in the ROM or an external storage device 130. The control circuit 101 thus receives instruction inputs applied to various types of manipulating devices arranged in the manipulation panel 110 while transmitting control instruction information responding to the received instruction inputs to the air-conditioning apparatus 200 via a communications interface 140 and an in-vehicle LAN 90.

Figure 2:
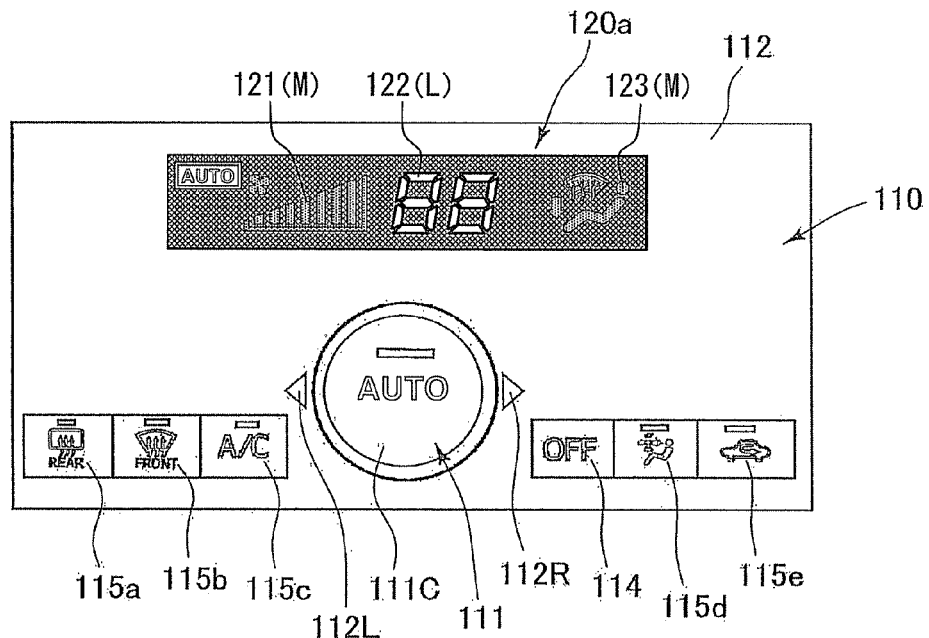
FIG. 2 is a front view of a manipulation panel.

The manipulation panel 110 includes, as manipulating devices for air-conditioning to input operation setup of the air-conditioning apparatus 200, various setup switches containing a multifunctional manipulating device 111. Those setup switches are arranged, for example, on a front surface 112 of a body of the manipulation panel 110 or the input manipulation apparatus 100, as illustrated in FIG. 2. The manipulation panel 110 further includes a display device 120 having a display window 120a for displaying the setup content or setup specifics designated by those setup switches.

The multifunctional manipulating device 111 includes two functions of a setup changeover manipulating device 111A and a target parameter switchover manipulating device 111B. The setup changeover manipulating device 111A is to change a setup content (i.e., to specify one of setup specifics of the setup content) of a change target control parameter. The change target control parameter is a control parameter, which is specified from among several control parameters for drive control of the air-conditioning apparatus 200. It is noted that a control parameter is also referred to as control information or a control information item. The target parameter switchover manipulating device 111B is to execute switchover to select or designate one of the several control parameters as the change target control parameter.

Figure 3:
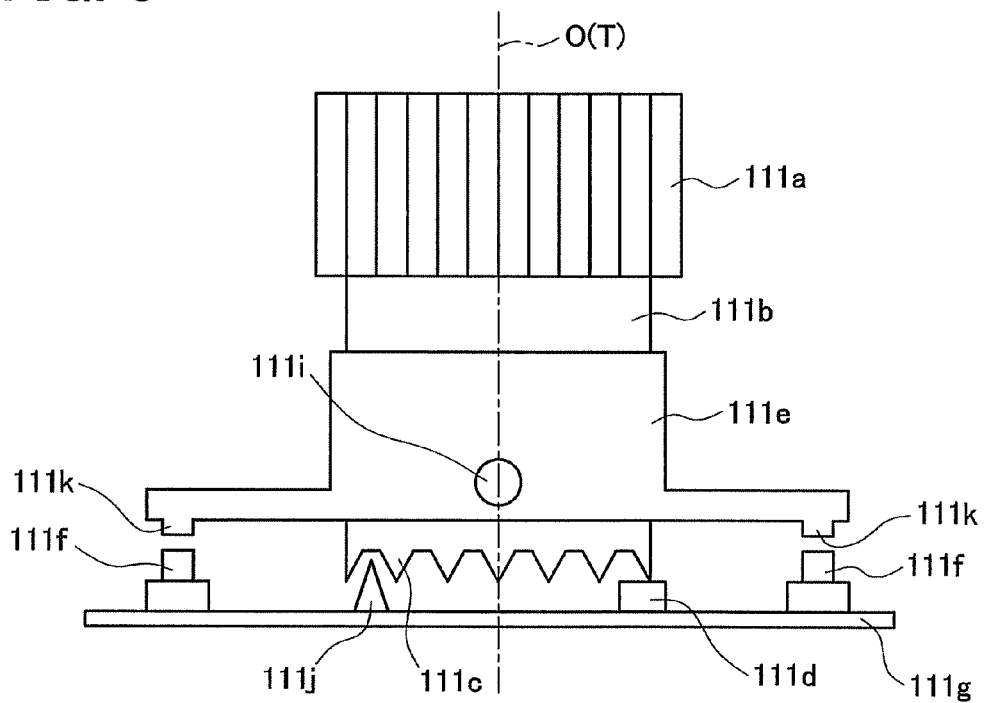
FIG. 3 is a view illustrating a multifunctional manipulating device of the input manipulation apparatus of FIG. 1.
Figure 4:
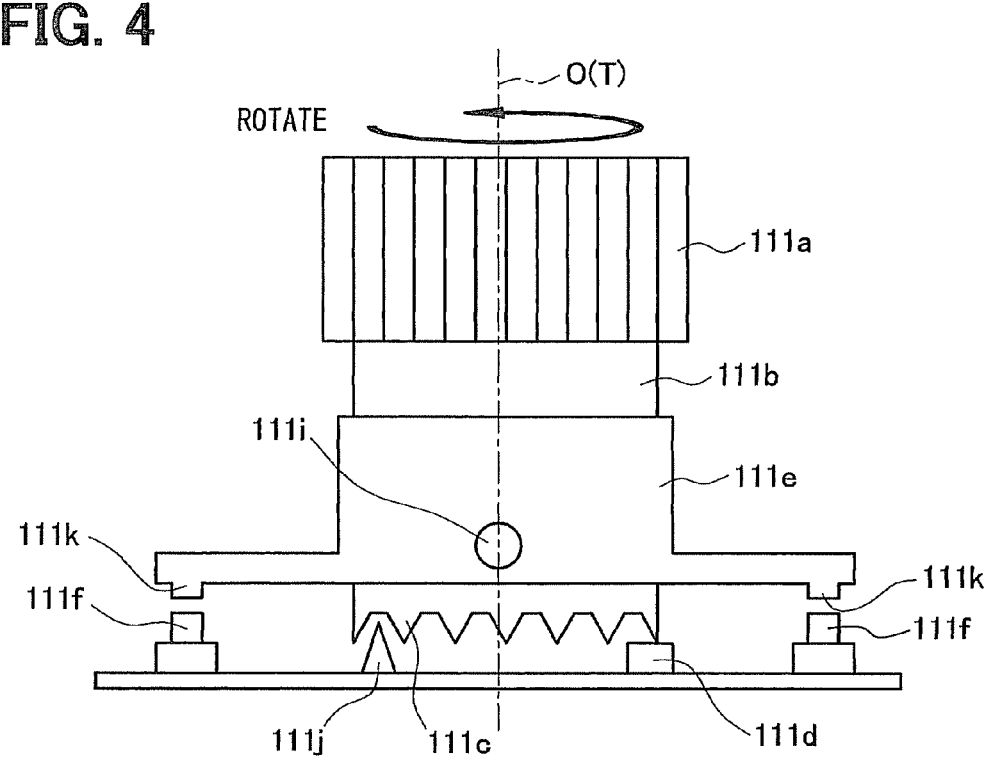
FIG. 4 is a view explaining a rotation manipulating action of the multifunctional manipulating device of FIG. 3.

The multifunctional manipulating device 111 of the present embodiment can be a bi-directional manipulating device which is bi-directionally manipulated in forward and backward mutually opposite directions. Further, as illustrated in FIGS. 3, 4, the multifunctional manipulating device 111 protrudes from the panel surface 112, which is a front surface of the body of the apparatus 100, while functioning as a dial manipulating device (also referred to as a rotation manipulating device) rotatable around a manipulation axis O (rotation axis), which intersects with (e.g., orthogonal to) the panel surface 112. In the present embodiment, the dial manipulating device serves as the above setup changeover manipulating device 111A. The rotation manipulating action applied to the dial manipulating device enables the change of the setup content or designation of one of the setup specifics of the change target control parameter. The control circuit 101 functions as a setup changing means or section which changes a setup content or designates a setup specific of the change target control parameter in the air-conditioning apparatus 200, depending on the rotation manipulating action of the multifunctional manipulating device 111.

It is noted that a change target control parameter is selected or designated from among several (candidate) control parameters; each of the control parameters contains a setup content having several setup specifics, which are changed or designated in a predetermined sequential changeover order. When the forward rotation manipulating action (e.g., clockwise rotation manipulating action) is applied to the multifunctional manipulating device 111, the setup content changes in respect of the setup specifics one by one in the forward sequential changeover order. When the backward rotation manipulating action (e.g., counterclockwise rotation manipulating action) is applied to the multifunctional manipulating device 111, the setup content changes in respect of the setup specifics one by one in the backward sequential changeover order. The changeover order is stored in the storage device 230 of the air-conditioning apparatus 200. The control circuit 201 switches the setup content in respect of the setup specifics in the changeover order based on a content of a control instruction signal transmitted from the control circuit 101 of the input manipulation apparatus 100 in connection with a rotation manipulating action of the multifunctional manipulating device 111.

Figure 5:
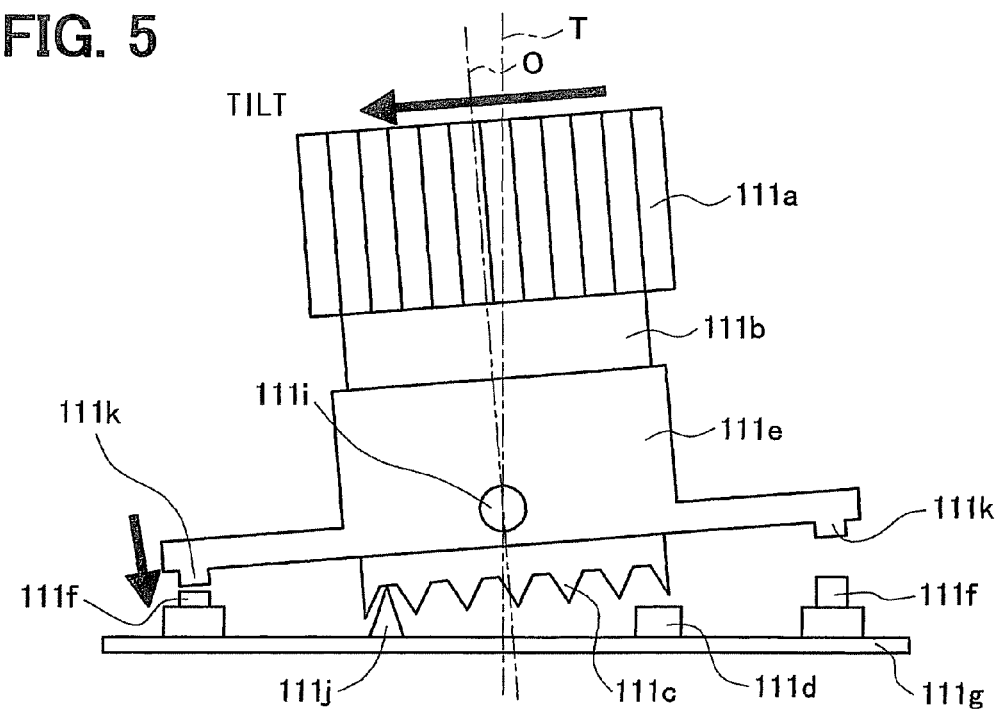
FIG. 5 is a view explaining a tilt manipulating action of the multifunctional manipulating device of FIG. 3.

In addition, the multifunctional manipulating device 111 can also have a manipulating action different from the above forward and backward rotation manipulating actions. With reference to FIGS. 3, 5, the multifunctional manipulating device 111 of the present embodiment has a function as a displacement manipulating device which can displace or move a manipulation axis O from a neutral position T to one of several predetermined displacement or movement directions. That is, the multifunctional manipulating device 111 in FIG. 5 of the present embodiment has a function as a tilt manipulating device which can execute a tilt manipulating action to tilt the manipulation axis O from the neutral position T to a predetermined direction (e.g., a right direction or a left direction).

It is noted that a tilt manipulating action can be included in a displacement manipulating action. In other words, the displacement manipulating action includes not only a tilt manipulating action but also a slide manipulating action, which is explained later. In the present embodiment, the tilt manipulating device serves as the above target parameter switchover manipulating device 111B. The change target control parameter can be thus assigned, by the tilt manipulating action, to one of the several control parameters of the air-conditioning apparatus 200.

Furthermore, the control parameter designated as the change target control parameter is stored in the storage device 130 of the input manipulation apparatus 100. The control circuit 101 functions as a target parameter switching means or section which executes switchover to designate a change target control parameter based on the tilt manipulating action of the multifunctional manipulating device 111. In addition, in the present embodiment, a switchover order of respective control parameters, which can be designated as a change target control parameter, is predetermined and stored in the storage device 230 of the air-conditioning apparatus 200. The control circuit 201 switches the change target control parameter between the control parameters in the switchover order based on a content of a control instruction signal transmitted from the control circuit 101 of the input manipulation apparatus 100 in connection with a tilt manipulating action of the multifunctional manipulating device 111. In the present embodiment, the tilt manipulating action of the multifunctional manipulating device 111 can be made in the two mutually opposite forward and backward directions. When the tilt manipulating action is made in the forward direction, the change target control parameter is assigned to each of the control parameters in the above switchover order one by one predetermined for the forward direction. When the tilt manipulating action is made in the backward direction, the change target control parameter is assigned to each of the control parameters in the above switchover order one by one predetermined for the backward direction.

In the present embodiment, the multifunctional manipulating device 111 is arranged at a central bottom of the panel surface 112 of the manipulation panel 110. The dial manipulating device 111A of the multifunctional manipulating device 111 is constructed of a manipulation knob (or handle) 111a, a manipulation shaft or axis 111b, and a rotation manipulation detection device 111A. The manipulation handle 111a is attached to the outer upper periphery of the rotation manipulation shaft 111b. The rotation manipulation detection device 111A detects the position of the manipulation handle 111a undergoing the rotation manipulating action. The target parameter switchover manipulating device 111B (also referred to as a tilt manipulating device) of the multifunctional manipulating device 111 is constructed of the above manipulation handle 111a, the above manipulation shaft 111b, a tilt member 111e surrounding the outer lower periphery of the manipulation shaft 111b, a tilt fulcrum member 111i for tiltably supporting the tilt member 111e, and a tilt manipulation detection device 111B to detect the presence or absence of the tilt manipulating action which exceeds an angular displacement predetermined in a predetermined displacement or movement direction relative to the manipulation handle 111a.

In the present embodiment, the tilt manipulating action can be made to tilt the manipulation handle 111a in each of the two right and left directions in the panel surface 112. Manipulation direction indicators 112L, 112R are respectively arranged at peripheral positions of the manipulation handle 111a in the panel surface 112 so as to indicate a manipulation direction (i.e., displacement manipulation direction).

The rotation manipulation detection device 111A of the multifunctional manipulating device 111A includes a detection subject line member 111c formed in a back end of the manipulation axis of the manipulation shaft 111b, and a rotation detection device 111d which detects rotation of the detection subject line member 111c. In the rotation manipulation detection device 111A of the present embodiment, the rotation displacement detection device 111d is provided to be a rotary encoder; the detection subject line member 111c is arranged at the back end of the cylindrical manipulation shaft 111b and provided with a patterned indented configuration having an amplitude against a direction orthogonal to the manipulation axis O. The rotary encoder 111d outputs the pulse signal in conjunction with the passage of each detection part of the detection subject line member 111c, thereby inputting a detection result to the control circuit 101. Further, a click member 111j is formed to allow the rotation of the manipulation handle 111a and provide manipulation comfortableness to the rotation by using the patterned indented configuration of the detection subject line member 111c. The rotary encoder 111d and the click member 111j are arranged on a circuit board 111g so as to electrically connect with the control circuit 101. Furthermore, the rotation manipulation detection device 111A may be achieved by another configuration.

The tilt manipulation detection device 111B includes switch bias members 111k, which are provided in the tilt member 111e at respective peripheral ends in the tilt direction, and tact switches 111f formed to correspond to the switch bias members 111k. When the tilt manipulating action is applied to the manipulation handle 111a to exceed a predetermined angular displacement from the neutral angle position T, the corresponding tact switch 111f is pressed to and biased by the switch bias member 111k which is arranged at the peripheral end of the tilt member 111e in the tilt direction. The tact switch 111f outputs the operation detection signal in conjunction with the press and bias to thereby input a detection result into the control circuit 101. The tact switches 111f are also arranged on the circuit board 111g. Furthermore, even when the manipulation handle 111a is at any angled position, any tilt manipulating action applied to the tilt member 111e can be detected by the tilt manipulation detection device 111B. The tilt member 111e is fixed to the apparatus body (unshown) via the tilt fulcrum member 111i so as to be unable to rotate around the manipulation axis O. Even when a rotation manipulating action is applied to the manipulation handle 111a, the switch bias member 111k opposes the tact switch 111f continuously. Furthermore, the tilt manipulation detection device 111B may be achieved by another configuration.

Figure 6:
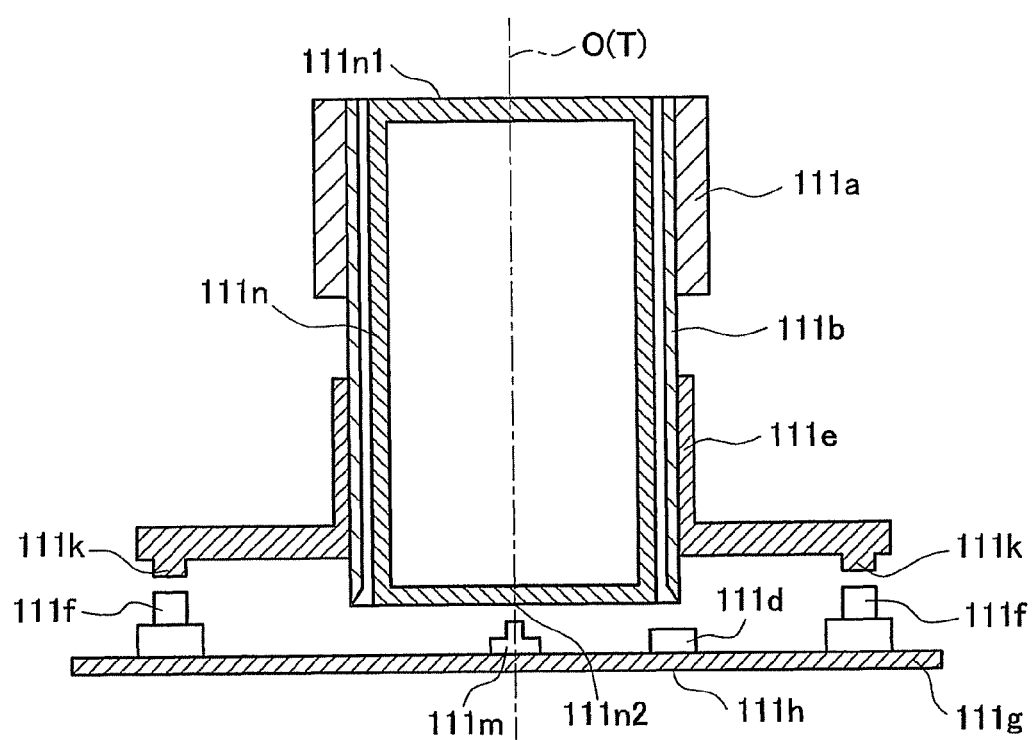
FIG. 6 is a cross-sectional view explaining a press manipulating action of the multifunctional manipulating device of FIG. 3.

In addition, the multifunctional manipulating device 111 of the present embodiment has a function as a press manipulating device 111C inside of the cylindrical manipulation handle 111a. The press manipulating device 111C can be pressed parallel with (i.e., in the direction of) the manipulation axis of the manipulation handle 111a. As shown in a sectional view of the multifunctional manipulating device 111 in FIG. 6, a cylindrical press manipulation handle 111n is arranged inside of the cylindrical manipulation handle 111a to be unable to rotate around the manipulation axis O. A front end surface 111n1 is on the side receiving the manipulating action of the apparatus body and defined as a press manipulating surface. A back end surface 111n2 is opposite to the front end surface 111n1 and defined as a press bias surface to bias a tact switch 111m in conjunction with a press manipulating action applied to the press manipulation handle 111n. The tact switch 111m is arranged on the circuit board 111g so as to be electrically connected with the control circuit 101. It is noted that FIGS. 3 to 5 omit to illustrate the configuration of the press manipulating device.

In the present embodiment, A tilt manipulating action applied to the multifunctional manipulating device 111 can select or designate, as a change target control parameter (also referred to as a change target control information item), one of the following with respect to the air-conditioning apparatus 200: a temperature setup parameter on air-conditioning air flow which is blown off to the vehicle compartment (also referred to as a blowoff air temperature parameter), an air quantity setup parameter (also referred to as a blowoff air quantity parameter), and a blowoff air outlet setup parameter. In contrast, a rotation manipulating action applied to the multifunctional manipulating device 111 can change a setup content (i.e., designate a setup specific among several setup specifics of the setup content) of the control parameter designated as the change target control parameter. In addition, the multifunctional manipulating device 111 of the present embodiment also functions as a press manipulating device (automatic switch) 111C. A press manipulating action applied can designate an automatic mode (automatic air-conditioning) of the air-conditioning apparatus 200. Thus, the press manipulating device 111C functions as a mode switchover manipulating device or an automatic mode designation manipulating device.

As illustrated in FIGS. 1 and 2, the manipulation panel 110 contains other switches other than the multifunctional manipulating device 111 as follows: an OFF switch 114 to turn off the air-conditioning apparatus 200 (also referred to as a mode switchover manipulating device or an OFF mode designation manipulating device) 114, and other switches 115. The other switches 115 include a front defroster switch 115a, a rear defroster switch 115b, an A/C (air-conditioning) switch 115c to operate a compressor and evaporator, a pollen elimination switch 115d, and an intake switchover switch 115e to change an intake air between an inside air and an outside air. Each of the switches is configured as a press manipulating device (i.e., a push switch). In conjunction with a press manipulating action, an operation signal is outputted to the control circuit 101. Upon receiving the operation signal, the control circuit 101 transmits a control instruction signal to the control circuit 201 of the air-conditioning apparatus 200.

The display screen or window 120a of the display device 120 is arranged in proximity of the multifunctional manipulating device 111 on the panel surface 112. For instance, the display window 120a is arranged at an upper central portion of the manipulation panel surface 112 to provide the display such that setup contents or setup specifics of the respective control parameters of the air-conditioning apparatus 200 can be visually recognized.

For instance, on the display window 120a, display regions 121, 122, 123 are arranged in a row to illustrate respective setup contents or setup specifics of several control parameters in accordance with the switchover order to assign the change target control parameter. The target parameter switchover manipulating device 111B (i.e., the multifunctional manipulating device 111), which is arranged below the display window 120a, is designed to execute switchover due to the tilt manipulating action to transfer or designate the display ranges 121, 122, 123 one by one according to the arranged row. The transfer direction of the forward directional tilt manipulating action is defined to accord with the forward direction of the row of the display regions 121,122,123. Thereby, with respect to the control parameter assigned with the change target, the switchover order due to the transfer manipulation can be visually recognized via the display window. In the present embodiment, the display window 120a has a rectangular shape having a longitudinal direction parallel with the transfer direction of the tilt manipulating action of the target parameter switchover manipulating device 111B; the several display regions 121, 122,123 are arranged in a row in the longitudinal direction.

Figure 7:
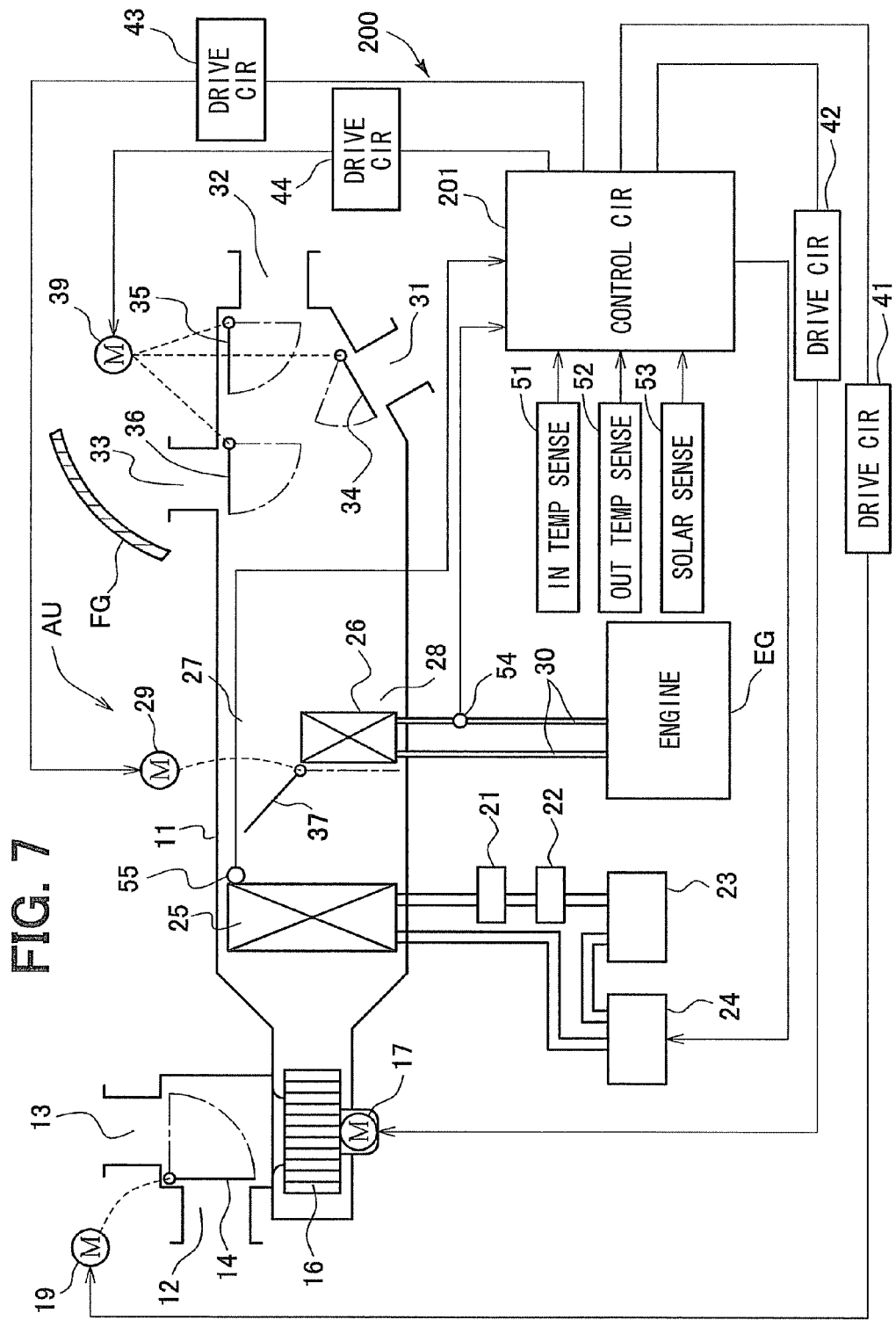
FIG. 7 is a diagram for explaining a configuration of an in-vehicle air-conditioning apparatus.

The air-conditioning apparatus 200 has a configuration of a known typical in-vehicle air-conditioning apparatus. That is, the air-conditioning apparatus 200 is provided with an air conditioning unit AU, for instance, as illustrated in FIG. 7. The air-conditioning unit AU of FIG. 7 has an air-conditioning casing 11 serving as an air flow channel. At an upstream portion of the channel, there are provided an inside air inlet 12 to suction air inside of the vehicle compartment and an outside air inlet 13 to suction air outside of the vehicle. The air inlets 12, 13 are alternatively opened and closed with an inside and outside switchover damper 14 driven by a motor 19.

Further, in the air conditioning casing 11, at a downstream portion of the inside and outside switchover damper 14, there are arranged a filter (unshown) to remove dust in the air and a blower motor 17 as an air-conditioning air generating device to drive a blower fan 16 for generating an air-conditioning wind to the vehicle compartment. The blower motor 17 suctions air via the respective air inlets 12, 13 and ventilates towards respective air outlets 31, 32, and 33.

In the air-conditioning casing 11, at a downstream portion of the blower motor 17, there is an evaporator 25. The evaporator 25 constitutes a known refrigerating circuit to circulate a coolant, together with a compressor 24, a capacitor 23, and an expansion valve 21.

In the air-conditioning casing 11, at a downstream portion of the evaporator 25, there are an air mix damper 37 and a heater core 26. The air-conditioning casing 11 accommodates (i) a warm air passage 28 for introducing air, which has passed through the evaporator 25, into the downstream side via the heater core 26, and (ii) a cold air passage 27, which functions as a bypass channel and introduces the air into the downstream side by bypassing the heater core 26. The air mix damper 37 is opened and closed by a motor 29 serving as a temperature adjustment driving means or device. The open and close drive causes changeover of the mixing ratio of the warm air which passes through the heater core 26 and the cold air which passes through the bypass channel 27, thereby adjusting the temperature of the blowoff air (air-conditioning air flow) which blows off to the vehicle compartment.

The heater core 26 heats air passing through using a heat source of the cooling water which circulates the inside of the engine EG serving as a drive source for vehicle traveling. In between the heater core 26 and the engine EG, there is arranged a circulation circuit 30 through which the cooling water circulates. Operating the electric pump (unshown) causes the cooling water heated in the engine EG to move to the heater core 26, and causes the cooling water cooled in the heater core 26 to return to the engine EG via the electric pump.

At a downstream end in the air-conditioning casing 11, there are arranged a defroster air outlet 33 for blowing off the air towards an inside of a windshield FG, a face air outlet 32 for blowing off the air towards the occupant's upper half of the body, and a foot air outlet 31 for blowing off the air towards the vehicle occupant's legs. At upstream portions of the air outlets 31, 32, and 33, there are provided mode switchover dampers 34, 35, and 36, respectively. The open-close drive of each mode switchover dampers 34, 35, and 36 is carried out by a motor 39.

The control circuit 201 of the air-conditioning apparatus 200 includes a known microcomputer containing a CPU, ROM, and RAM while executing various air-conditioning control programs stored in the ROM or an external storage device 230, during the operation. In conjunction with various manipulating actions applied to the manipulation panel 110, the control circuit 201 acquires control instruction signals transmitted from the input manipulation apparatus 100 via the in-vehicle LAN 90 and the communications interface 140 (communications means). Furthermore, the control circuit 201 acquires detection result information of the various air-conditioning sensors 51 to 55 and executes the drive control of the various air-conditioning drive devices 24, and 211 to 214 based on such acquired information.

The air-conditioning drive devices 211 to 214 include driving actuators or motors 17, 19, 29, and 39 and drive circuits 41 to 44, respectively. Each of drive circuits 41 to 44 supplies driving electric currents to the corresponding actuator (the motor 19 for the inside and outside air switchover dampers, the blower motor 17, the motor 29 for the air mix dampers, the motor 39 for the mode switchover dampers) based on the drive instruction signals received from the control circuit 201, respectively.

The air-conditioning sensors 51 to 55 include an inside air temperature sensor 53 to detect a temperature of the vehicle compartment, an outside air temperature sensor 52 to detect a temperature of an outside of the vehicle, a solar sensor 51 to detect an amount of insulation, a cooling water temperature sensor 54 to detect a temperature of the cooling water mentioned above, and a post-evaporator sensor 55 to detect a temperature of the air immediately after passing through the evaporator 25 mentioned above. Each detection result information is outputted to the control circuit 201.

The control circuit 201 of the air-conditioning apparatus 200 can set up or designate one from among two or more control modes, and execute drive control of the various air-conditioning drive devices 211 to 214, and 24 according to the designated control mode. In the present embodiment, three types of control modes of an automatic mode (automatic air-conditioning), an OFF mode, and a manual mode (usual mode) can be designated selectively.

The control mode designated in the air-conditioning apparatus 200 is stored in the storage device 130. Thus, the control circuit 201 functions as a mode designating means or section to designate respective control modes.

The automatic mode is defined as follows. A predetermined control parameter from among the several control parameters in the air-conditioning apparatus 200 is designated as an aim control parameter; the control contents (i.e., setup contents) of the remaining control parameters other than the aim control parameter are automatically set up or designated using an arithmetic process predetermined based on the setup content of the aim control parameter. In the automatic mode with respect to the air-conditioning apparatus 200 according to the present embodiment, an air-conditioning air temperature setup parameter (i.e., a control parameter for a temperature adjustment function) is designated as the aim control parameter while the remaining control parameters are an air quantity setup parameter (i.e., a control parameter for a fan function) and an air outlet setup parameter (i.e., a control parameter for a mode function); The setup contents or setup specifics of the remaining control parameters are set up or designated automatically in an arithmetic process based on the setup content or setup specific of the temperature setup parameter and detection results of the air-conditioning sensors 51 to 55. The setup contents or setup specifics of the air quantity setup parameter and blowoff outlet setup parameter are automatically calculated based on the arithmetic process according to the known TAO method to control a required air temperature and be often used for the air-conditioning control.

The control circuit 101 functions as an automatic mode designating means or section to designate or assign an automatic mode to the control circuit 201 in conjunction with an automatic mode designation manipulating action, which is a rotational axis-direction press manipulating action applied to the multifunctional manipulating device 111. Furthermore, the control circuit 101 also functions as an automatic mode canceling means or section to designate or assign a manual mode to the control circuit 201 by canceling the automatic mode in conjunction with a manipulating action to change the setup content of a predetermined control parameter (hereinafter referred to as an automatic mode cancellation-functioned control parameter) during the automatic mode being designated.

The OFF mode is defined as a control mode to cause the air-conditioning apparatus 200 to move to a predetermined standby state (including a stop state). In the present embodiment, the OFF mode is a control mode which provides at least a lower power consumption state to the air-conditioning apparatus 200 in comparison with other control modes such as an automatic mode and a manual mode. According to the OFF mode of the present embodiment, for ventilating the vehicle compartment, the blower drive device 214 is continuously driven at a predetermined level while other drive devices 211 to 213, and 24 are maintained in the OFF state (a non-drive state). It is noted that among the several control parameters in the air-conditioning apparatus 200 there is an OFF mode cancellation-functioned control parameter to cancel the presently designated OFF mode in conjunction with the change of the setup content to thereby return to the drive state.

The control circuit 101 functions as an OFF mode designating means or section to designate or assign an OFF mode to the control circuit 201 in conjunction with an OFF mode designation manipulating action, which is a press manipulating action applied to the OFF switch 114. The control circuit 101 functions as an OFF mode canceling means or section to cancel the OFF mode of the control circuit 201 and switch to or designate the manual mode in conjunction with an manipulating action to the setup content of the OFF mode cancellation-functioned control parameter (referred to as an OFF mode cancellation manipulating action). In the present embodiment, an air quantity setup parameter is designated as the OFF mode cancellation-functioned control parameter. In addition, in the present embodiment, when a manipulating action is made so as to change the setup content of each of the remaining control parameters other than the OFF mode cancellation-functioned control parameter among the several control parameters in the in-vehicle apparatus 200 during the OFF mode being designated, the changeover of the setup content is prohibited and cancelled by the control circuit 101, thereby producing no change. Thus, the control circuit 101 functions as a setup changeover restricting means or section.

The manual mode is a control mode to execute a drive control of the various air-conditioning drive devices 17, 19, 29, 39, and 24 according to the setup contents of the various control parameters designated or set up by the various setup switches on the manipulation panel 110. The manual mode is set up or designated in conjunction with a manipulating action to cancel the automatic mode or OFF mode. In contrast, the manual mode is cancelled in conjunction with a mode switchover manipulating action to set up or designate the automatic mode, OFF mode, or the like.

The display device 120 functions as a setup display means or device to display on a window the setup content or setup specifics of each of control parameters which can be designated as the change target control parameter among the control parameters in the air-conditioning apparatus 200. The display device 120 also functions as a target parameter indication means or device in which, in the display on the window, the control parameter designated as the change target control parameter is visually recognized or visually highlighted. In the present embodiment, the display window 120a contains the display region 121 to display the setup content (i.e., setup specifics) of the air quantity setup parameter for the air-conditioning air flow, the display region 122 to display the setup content (i.e., setup specifics) of the temperature setup parameter for the air-conditioning air flow, and the display region 123 to display the setup content (i.e., setup specifics) of the air outlet setup parameter for the air-conditioning air flow. The setup content of the control parameter selected or designated as the change target control parameter is displayed in a highlighted state L while the setup contents of the control parameters not designated as the change target control parameter are displayed in a not-highlighted state M. In the automatic mode and the manual mode, as illustrated in (1) and (3) in FIGS. 9A to 9C, the setup content or setup specifics 121,122,123 of all the control parameters which can be designated as a change target control parameter are displayed. In the OFF mode, as illustrated in (2) of FIGS. 10A to 10C, only the setup content or setup specifics of the control parameter designated as a change target control parameter is displayed, whereas the setup content of the remaining control parameters are not displayed. Such a configuration enables the detection or recognition of the drive state in the automatic mode and manual mode and the standby state in the OFF mode, with respect to the air-conditioning apparatus 200. It is noted that the display state N of the change target control parameter in the OFF mode is comparable with the not-highlighted state M in the automatic mode and manual mode.

As explained above, there is a conventional air-conditioning system having an input manipulation apparatus like the multifunctional manipulating device 111 of the present embodiment, which has both of the functions of the above target parameter switchover manipulating device (equivalent to 111A of the present embodiment), and the above setup changeover manipulating device (equivalent to 111B of the present embodiment). When a predetermined control mode such as the automatic mode and the OFF mode is designated in the air-conditioning apparatus 200, controls are executed as illustrated in FIGS. 13A to 13C, 14A to 14C, 15A to 15C, and 16A to 16C.

Figure 13A:
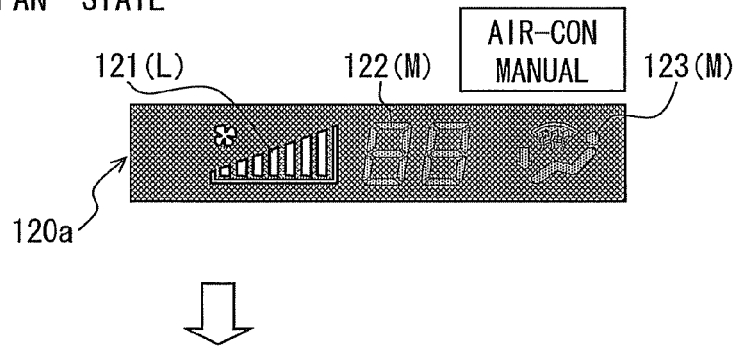
FIGS. 13A to 13C are diagrams for explaining issues when selecting an automatic mode in a prior art.
Figure 13A:
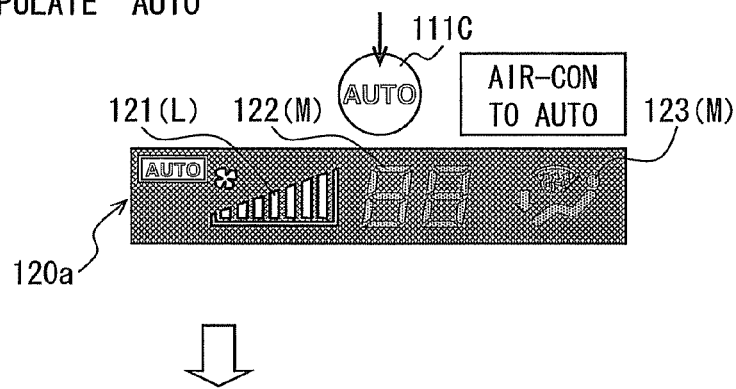
Figure 13A:
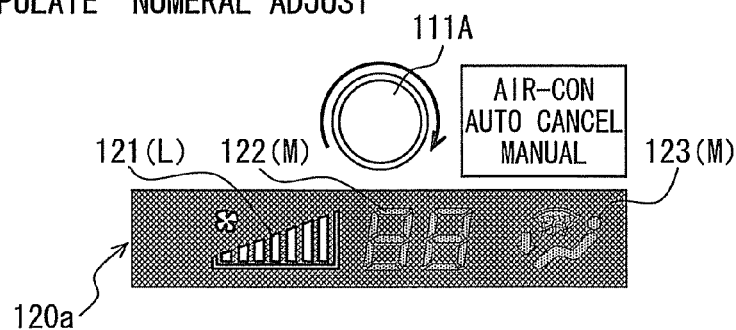
Figure 13B:
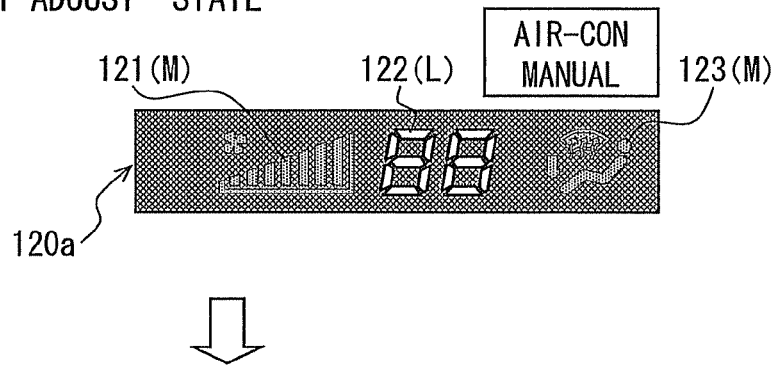
Figure 13B:
Figure 13B:
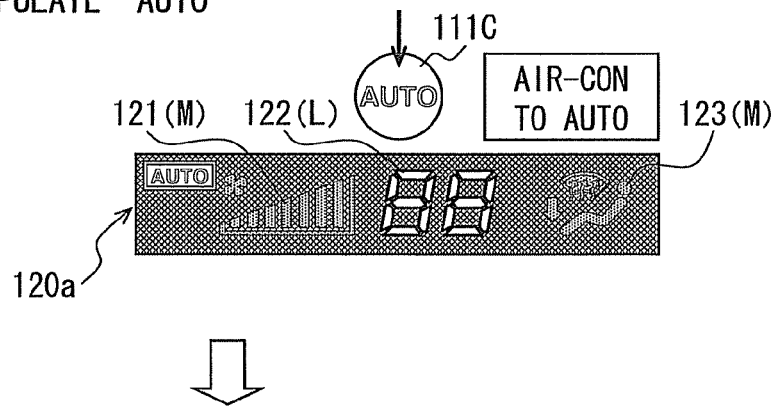
Figure 13B:
Figure 13B:
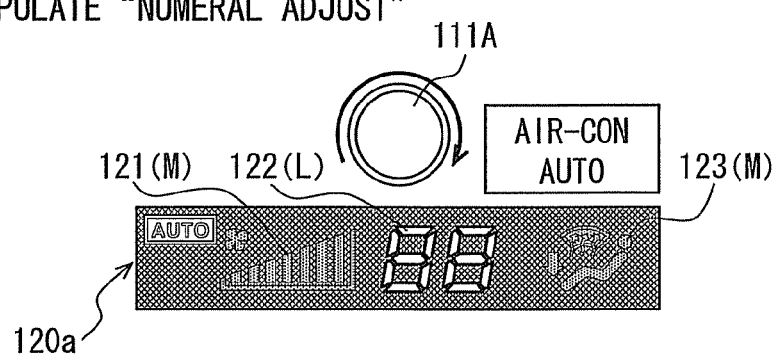
Figure 13C:
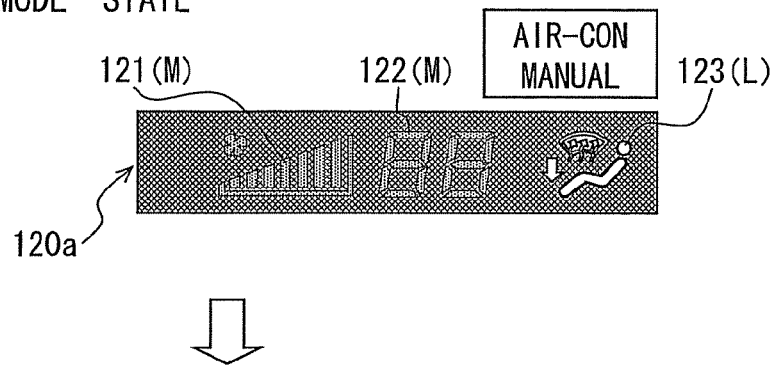
Figure 13C:
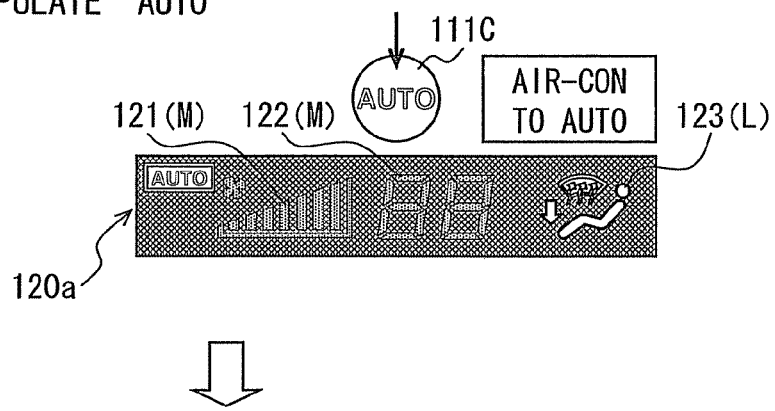
Figure 13C:
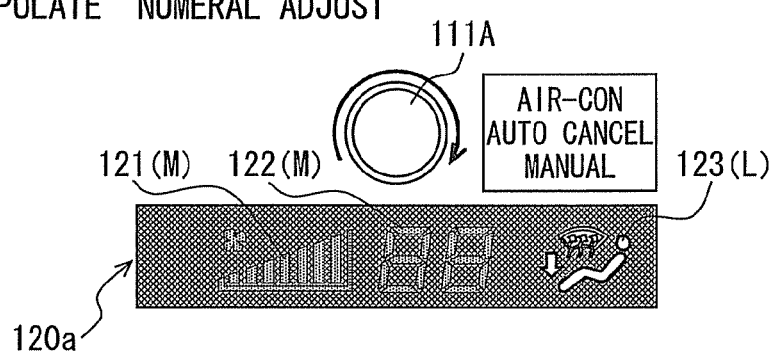
Figure 14A:
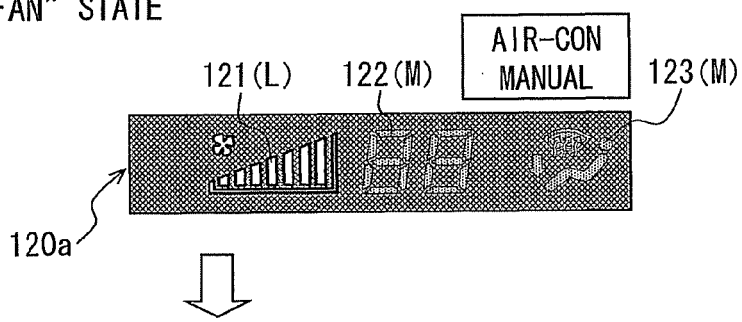
FIGS. 14A to 14C are diagrams for explaining issues when selecting an automatic mode in a prior art.
Figure 14A:
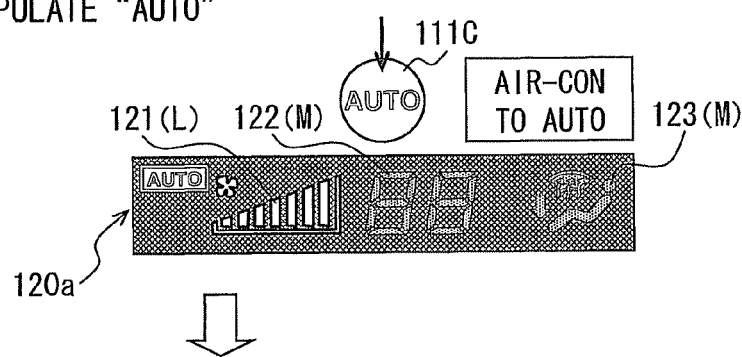
Figure 14A:
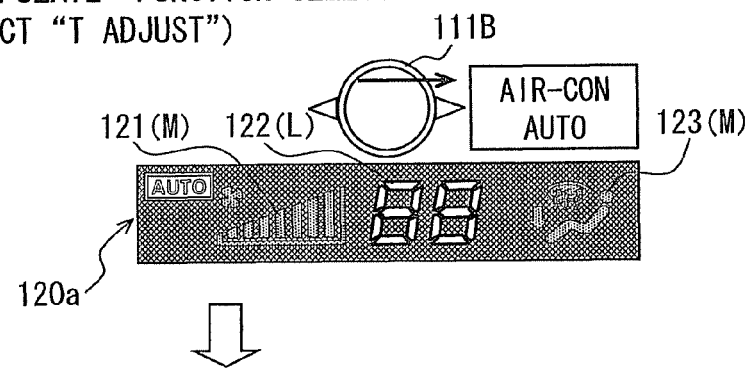
Figure 14A:
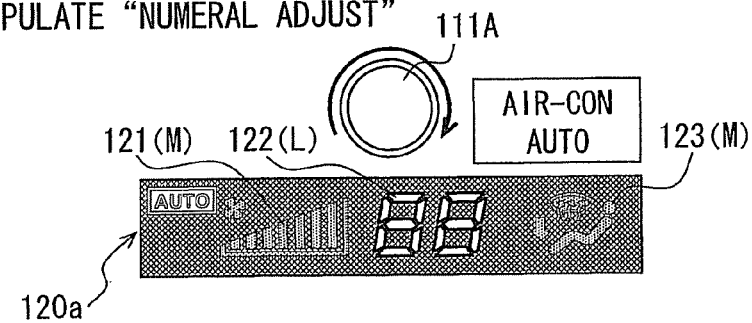
Figure 14B:
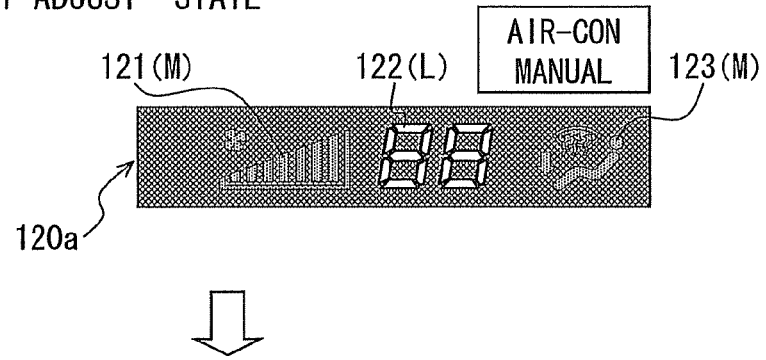
Figure 14B:
Figure 14B:
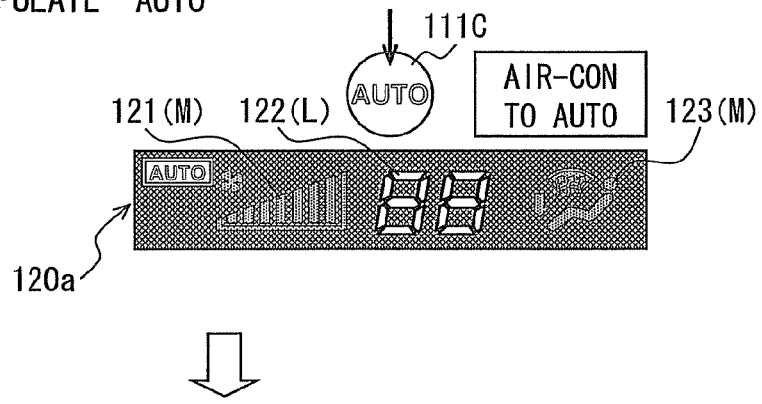
Figure 14B:
Figure 14B:
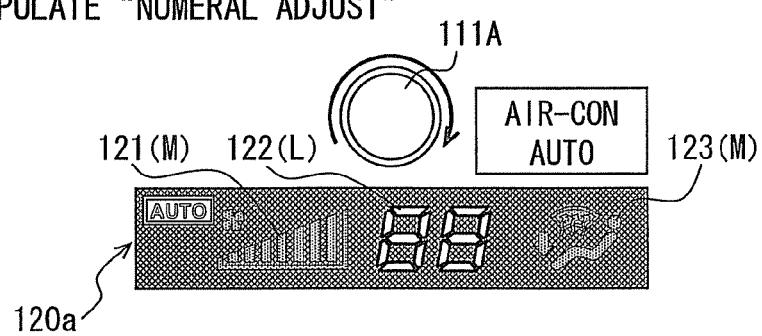
Figure 14C:
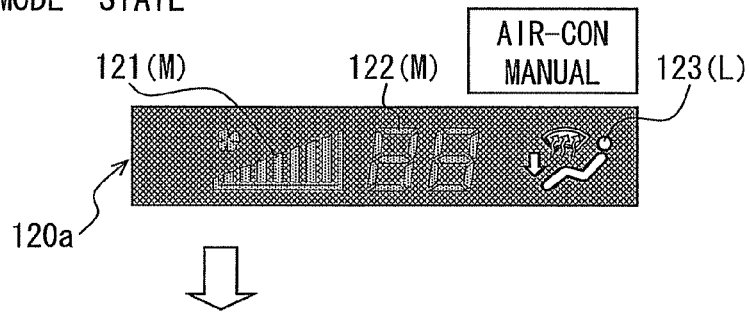
Figure 14C:
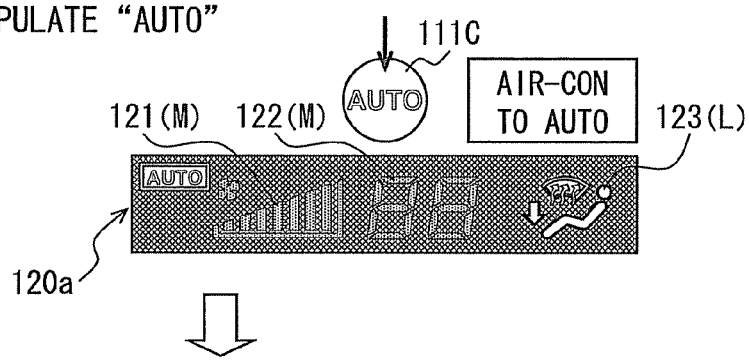
Figure 14C:
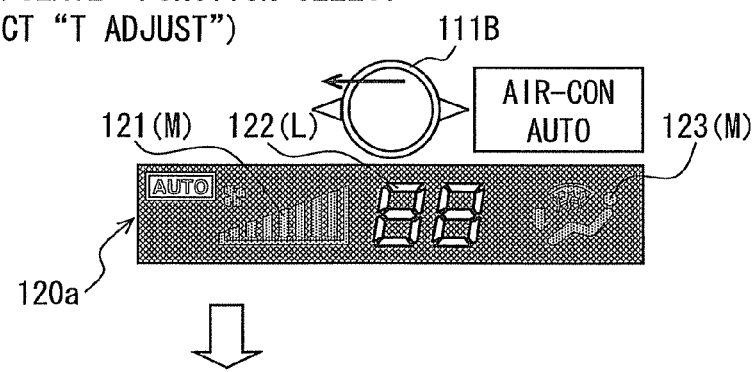
Figure 14C:
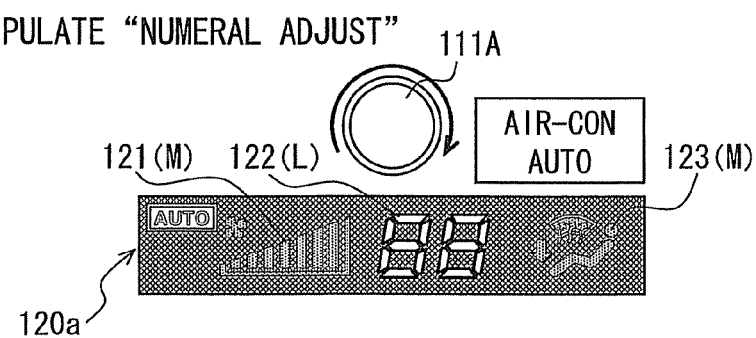

With reference to FIG. 13A or 13C, the change target control parameter of the setup changeover manipulating device 111A is assigned to the air quantity setup parameter (fan function) or the air outlet setup parameter (mode selection function) during the manual mode being designated. The automatic mode (automatic air-conditioning) is then designated to thereby execute switchover to replace the manual mode in the air-conditioning apparatus 200. In such cases, when the manual mode is switched to the automatic mode, the change target control parameter of the setup changeover manipulating device (111A) is maintained unchanged. That is, in (2) of FIG. 13A and (2) of FIG. 13C, the change target control parameter is assigned to the air quantity setup parameter (fan function) and the air outlet setup parameter (mode selection function), respectively. Thus, when the setup changeover manipulating device is manipulated during the automatic mode being designated, the automatic mode, which has been designated intentionally, is thereby canceled and the manual mode is again designated by replacing the automatic mode.

During the automatic mode being designated, the most frequently executed user's manipulation is changing of the setup content of the temperature setup parameter, which is the aim control parameter in the automatic mode. To that end, with respect to the conventional apparatus, in order to change the setup content of the temperature setup parameter, an additional manipulating action is necessary. That is, with reference to (3) in FIG. 14A, and (3) in FIG. 14C, an additional manipulating action is necessary against the target parameter switchover manipulating device (111B). That is, after manipulating the target parameter switchover manipulating device (111B), the setup changeover manipulating device (111A) needs to be manipulated; thus, two steps or two times of manipulating actions are necessary, posing undesirable manipulability.

Figure 15A:
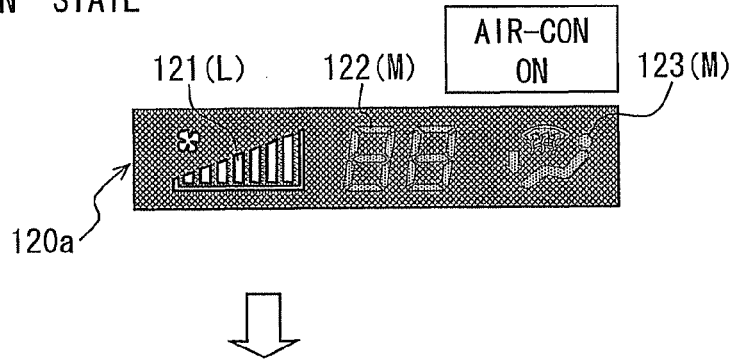
FIGS. 15A to 15C are diagrams for explaining issues when selecting an OFF mode in a prior art.
Figure 15A:
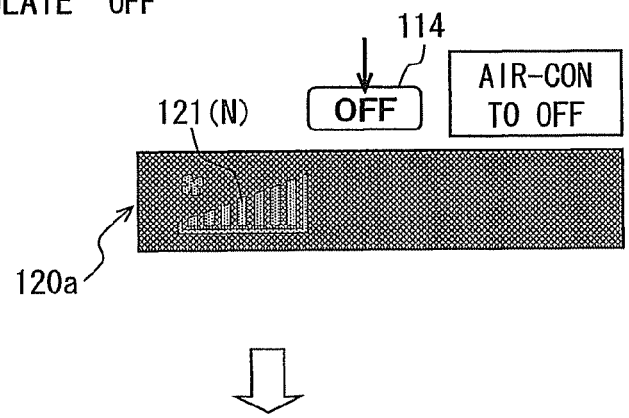
Figure 15A:
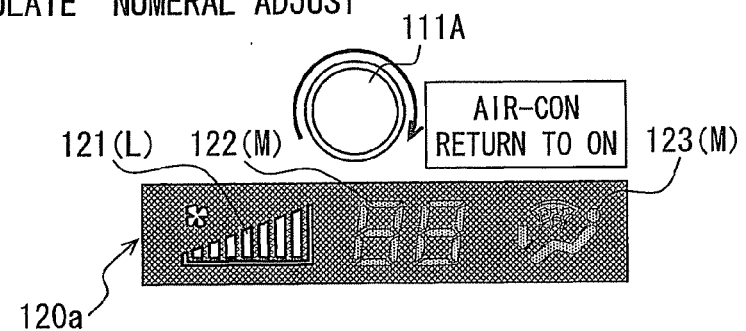
Figure 15B:
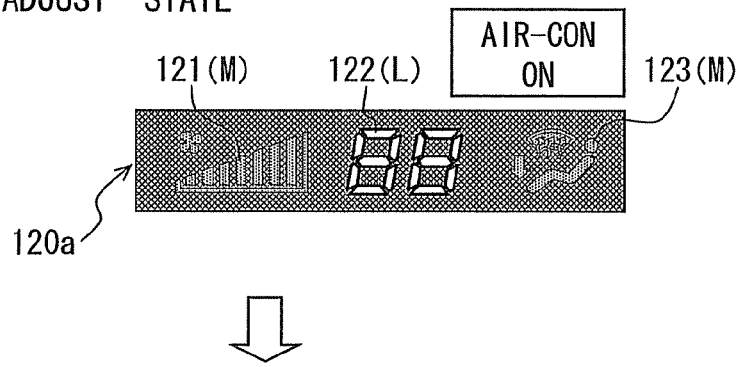
Figure 15B:
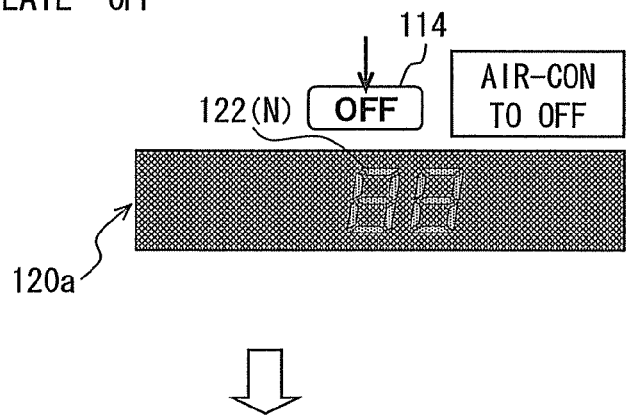
Figure 15B:
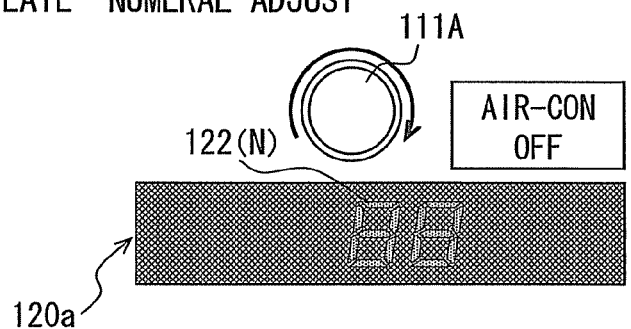
Figure 15C:
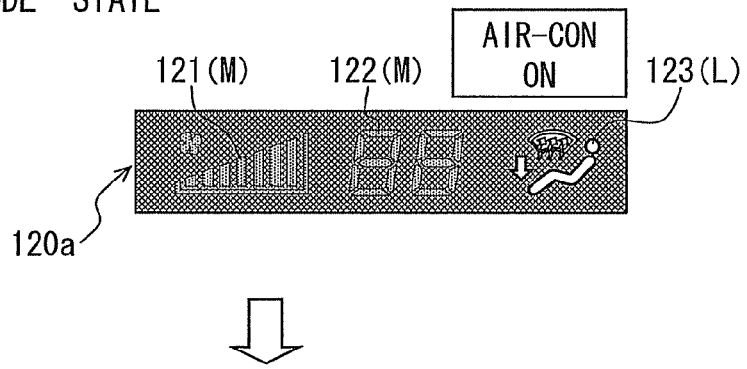
Figure 15C:
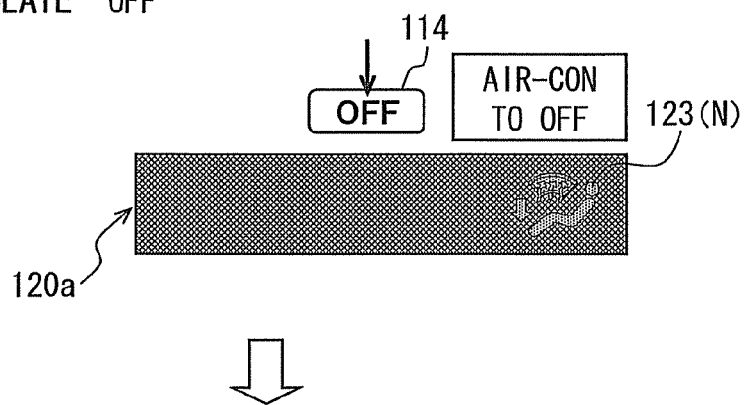
Figure 15C:
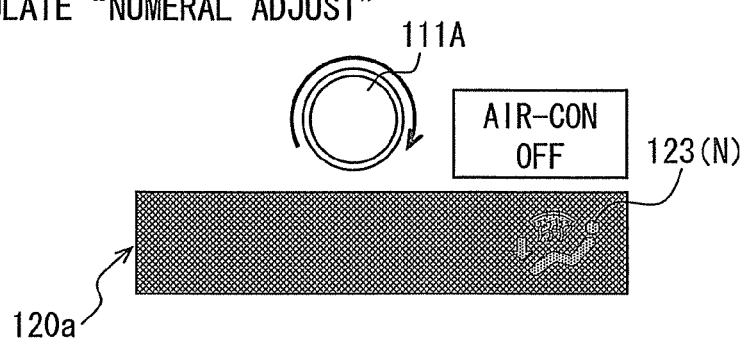
Figure 16A:
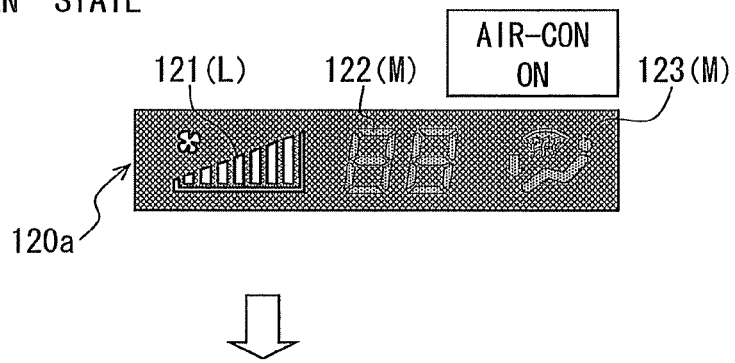
FIGS. 16A to 16C are diagrams for explaining issues when selecting an OFF mode in a prior art.
Figure 16A:
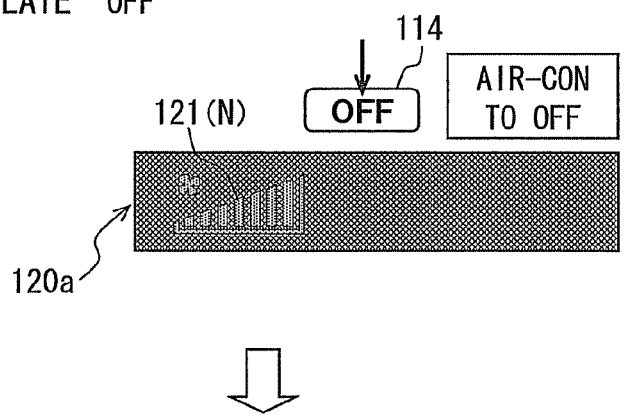
Figure 16A:
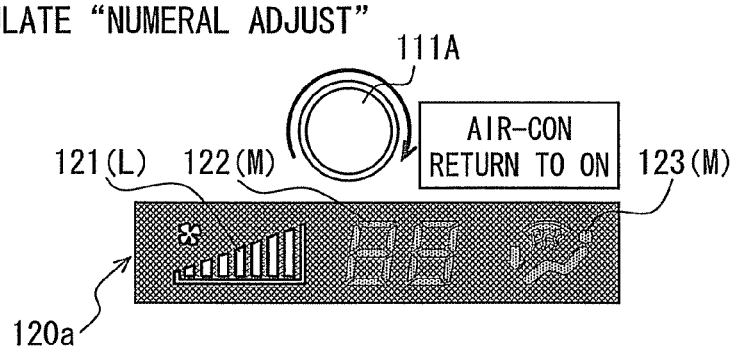
Figure 16B:
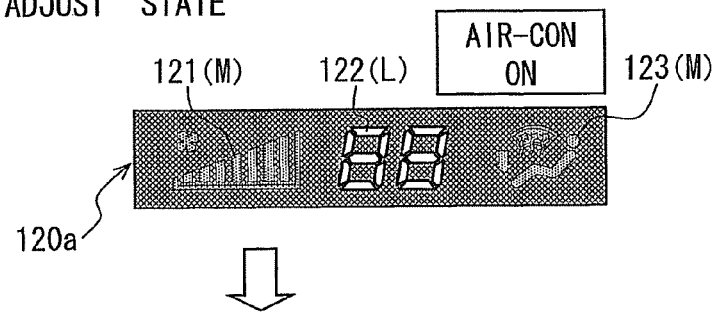
Figure 16B:
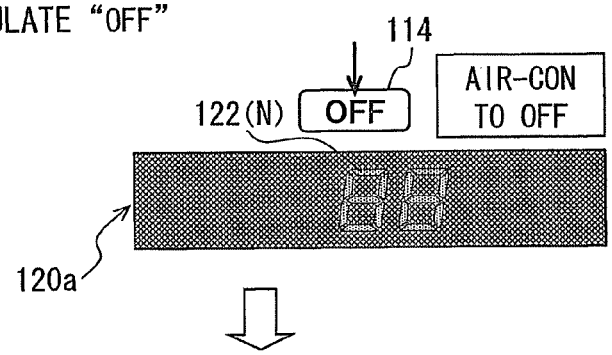
Figure 16B:
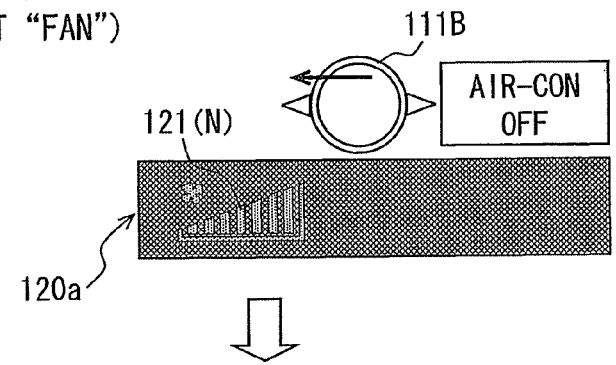
Figure 16B:
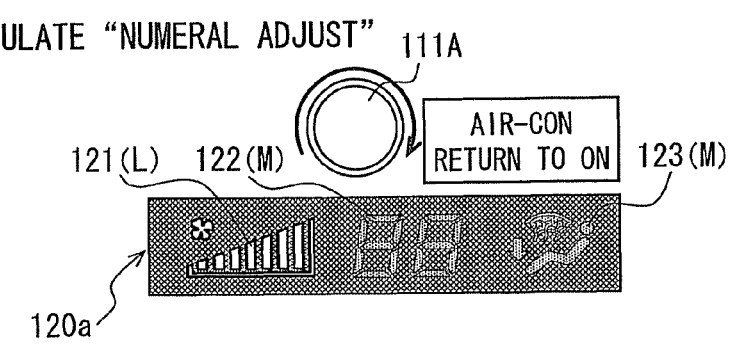
Figure 16C:
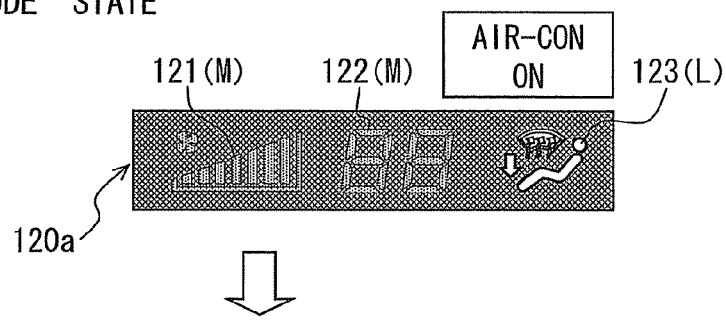
Figure 16C:
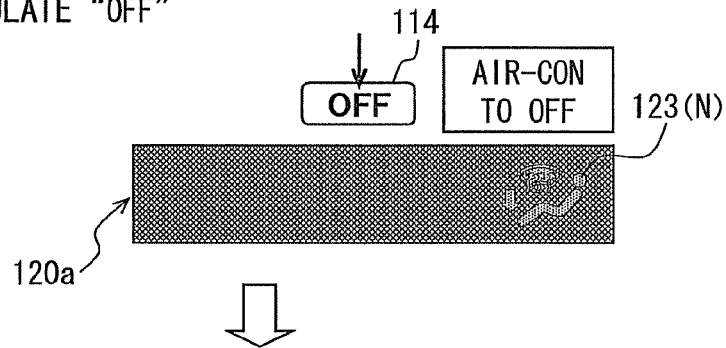
Figure 16C:
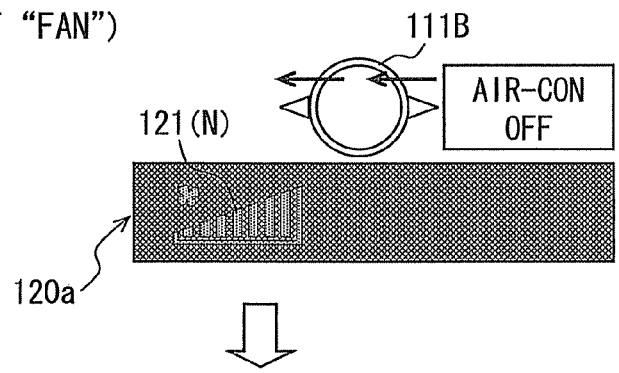
Figure 16C:
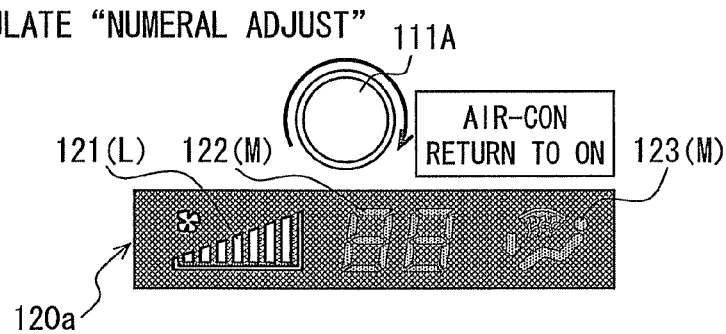

Furthermore, with reference to FIG. 15B or 15C, the change target control parameter of the setup changeover manipulating device 111A is assigned to the air temperature setup parameter (temperature adjustment function) or the air outlet setup parameter (mode selection function), respectively. The OFF mode (air-conditioning OFF) is then designated to thereby execute switchover in the air-conditioning apparatus 200. In such cases, when the OFF mode is designated, the change target control parameter of the setup changeover manipulating device (111A) is maintained unchanged. Thus, when the setup content changeover manipulating device is manipulated, with reference to FIG. 15B or 15C, the change target control parameter of the setup changeover manipulating device (111A) is maintained unchanged to be assigned to the air temperature setup parameter (temperature adjustment function) or the air outlet setup parameter (mode selection function), respectively. The effective manipulation cannot be thus performed.

During the OFF mode being designated, the most frequently executed user's manipulation is canceling of the OFF mode and re-driving of the air-conditioning apparatus 200. To that end, with respect to the conventional apparatus, in order to execute such manipulation (i.e., a manipulating action to change the setup content of the air quantity setup parameter), an additional manipulating action is necessary. That is, with reference to (3) in FIG. 16B, and (3) in FIG. 16C, an additional manipulating action is necessary against the target parameter switchover manipulating device (111B). That is, after manipulating the target parameter switchover manipulating device (111B), the setup changeover manipulating device (111A) needs to be manipulated; thus, two steps or two times of manipulating actions are necessary, posing undesirable manipulability.

Figure 8:
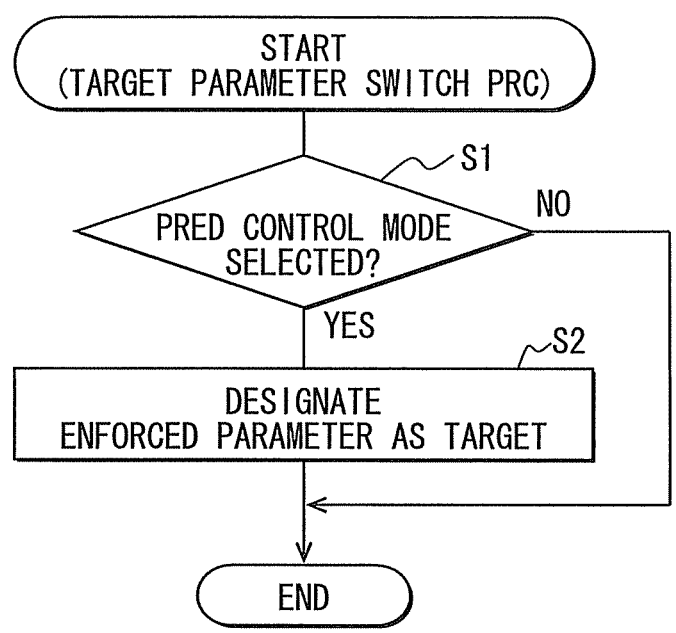
FIG. 8 is a flowchart diagram for illustrating a change target control parameter switchover process.

Thus, in the conventional vehicular air-conditioning system, when a user executes a manipulating action having the largest repetition times/highest preference degree in a predetermined control mode in the air-conditioning apparatus 200, the possibility to need two steps of manipulating actions is high, thereby degrading manipulability. In contrast, the present embodiment is designed to achieve a configuration in which once a predetermined control mode of the air-conditioning apparatus 200 is designated, the manipulation of the user's highest priority can be executed by one step manipulating action. In detail, the control circuit 101 of the input manipulation apparatus 100 executes the program stored in the storage device 130 to execute a process to perform switchover of the change target control parameter as illustrated in FIG. 8.

It is further noted that a flowchart or the processing of the flowchart in the present application includes sections (also referred to as steps), which are represented, for instance, as S1. Further, each section can be divided into several subsections while several sections can be combined into a single section. Furthermore, each of thus configured sections can be referred to as a means or unit and achieved not only as a software device but also as a hardware device.

At S1, the control circuit 101 of the input manipulation apparatus 100 determines the presence or absence of the switchover manipulating action to switch to a predetermined control mode. When it is determined that the changeover manipulating action to the predetermined control mode is made at S1, the processing proceeds to S2. When it is determined that the changeover manipulating action to the predetermined control mode is not made at S1, the present process is then ended.

At S2, the control circuit 101 executes enforcement switchover to designate, as a change target control parameter stored in the storage device 130, an enforcement change target control parameter, which is a predetermined control parameter included in the several control parameters in the air-conditioning apparatus 200. The present process is then ended. The control circuit 101 thus functions as a target parameter enforcement switchover means or section by processing S2. It is noted that the present process is repeatedly executed with predetermined intervals.

The process of FIG. 8 is explained with reference to FIGS. 9A to 9C, and 10A to 10C in cases that the predetermined control mode is assigned to the automatic mode and the OFF mode, respectively.

Figure 9A:
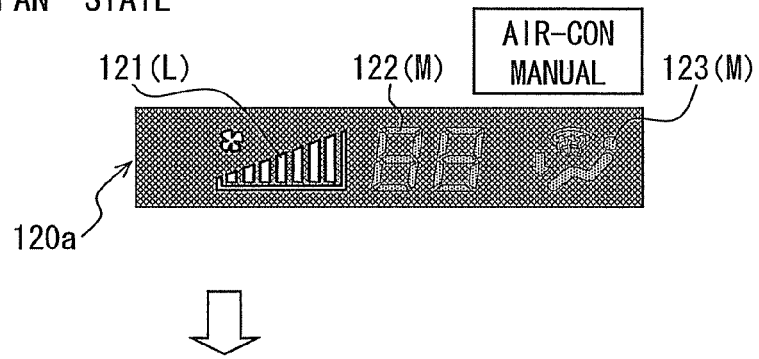
FIGS. 9A to 9C are diagrams for explaining processes when selecting an automatic mode according to the embodiment.
Figure 9A:
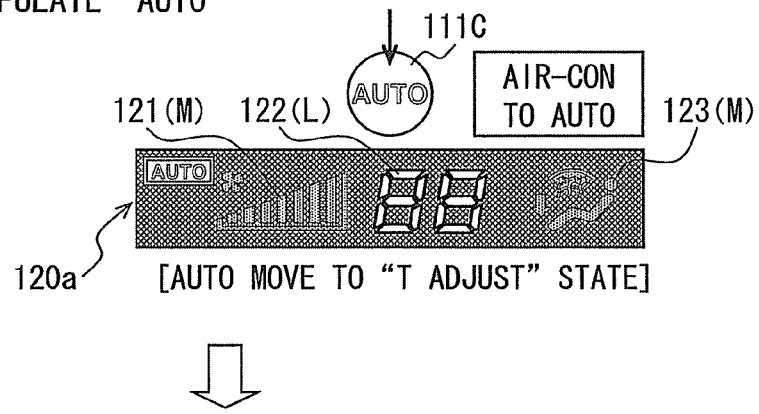
Figure 9A:
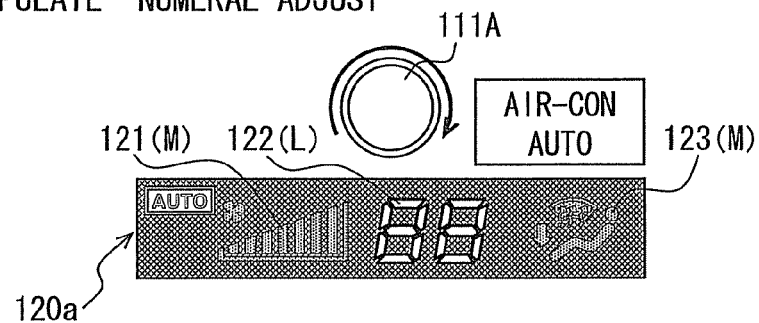
Figure 9B:
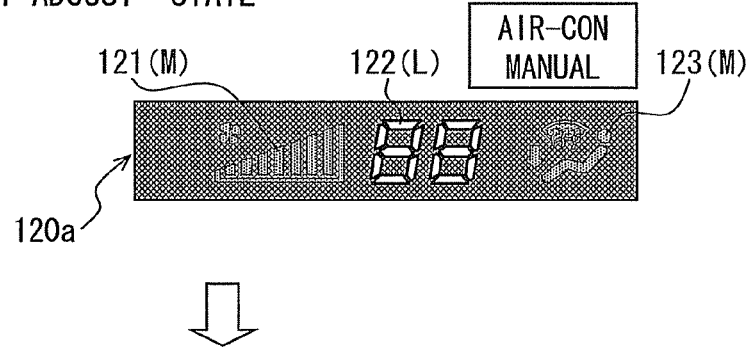
Figure 9B:
Figure 9B:
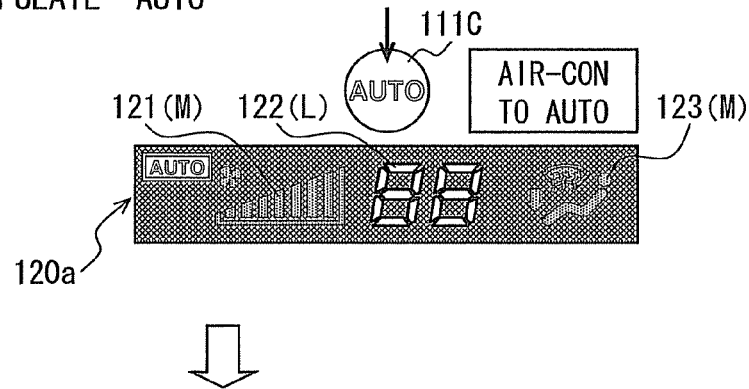
Figure 9B:
Figure 9B:
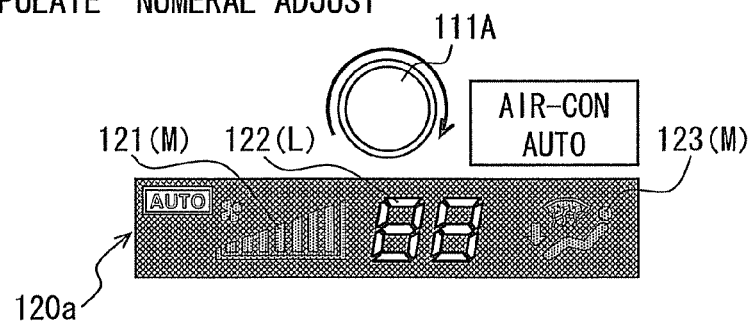
Figure 9C:
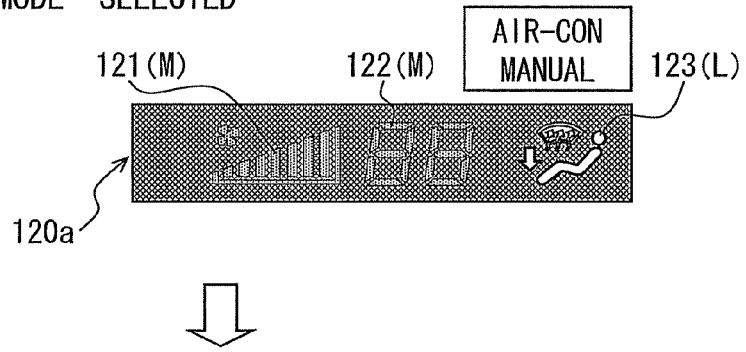
Figure 9C:
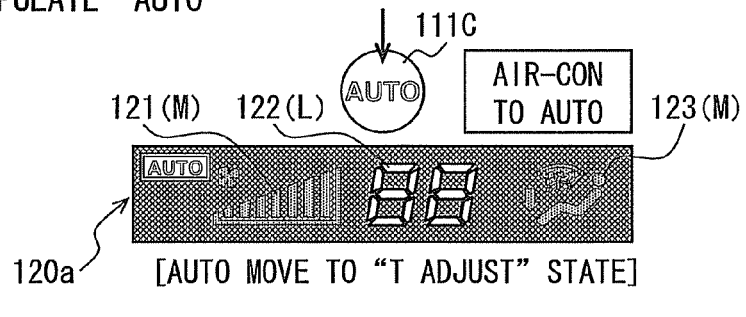
Figure 9C:
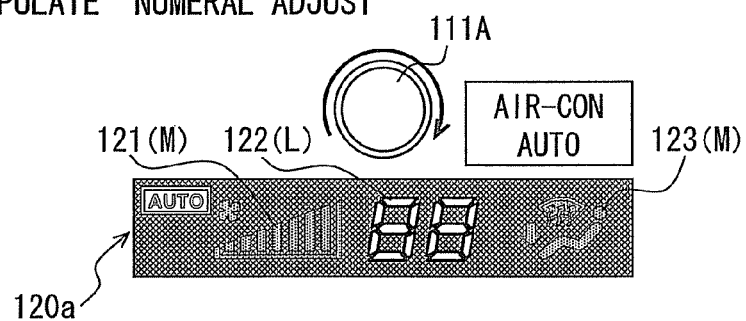

FIG. 9A illustrates the case that during the air quantity setup parameter (fan function) being designated, the manual mode is switched into the automatic mode. FIG. 9B illustrates the case that during the air temperature setup parameter (temperature adjustment function) being designated, the manual mode is switched into the automatic mode. FIG. 9C illustrates the case that during the air blowoff outlet setup parameter (mode selection function) being designated, the manual mode is switched into the automatic mode. In any case of the above three cases, after switching into the automatic mode, the change target control parameter is forcibly or automatically (i.e., is enforced to be) assigned to the aim control parameter (i.e., the temperature setup parameter at the present instance) the setup content of which the user tends to change during the automatic mode being designated. Therefore, after transferring to the automatic mode, if a rotation manipulating action is applied to the multifunctional manipulating device 111, the temperature setup control parameter can be adjusted immediately, thereby eliminating the conventional two steps of manipulating actions.

Figure 10A:
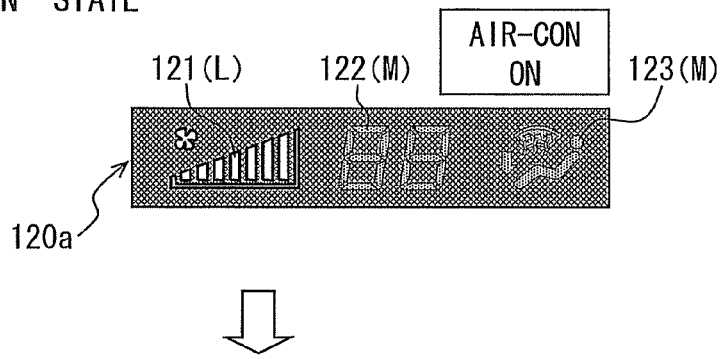
FIGS. 10A to 10C are diagrams for explaining processes when selecting an OFF mode according to the embodiment.
Figure 10A:
Figure 10A:
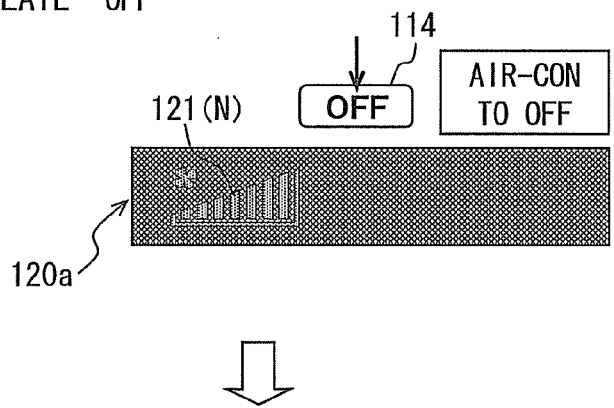
Figure 10A:
Figure 10A:
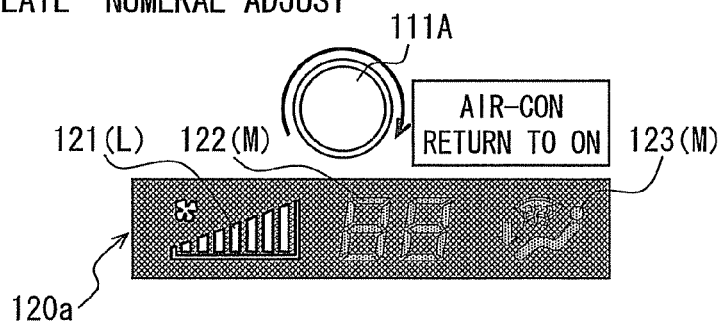
Figure 10B:
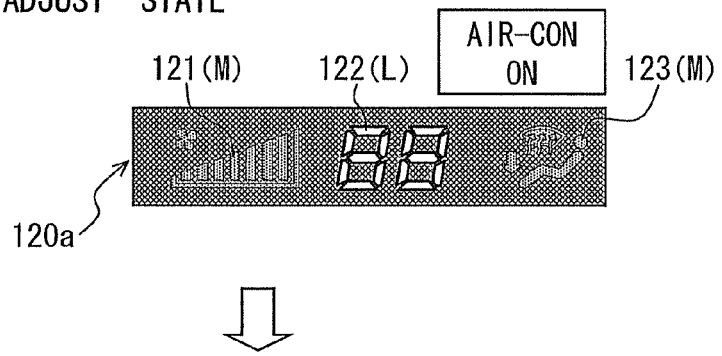
Figure 10B:
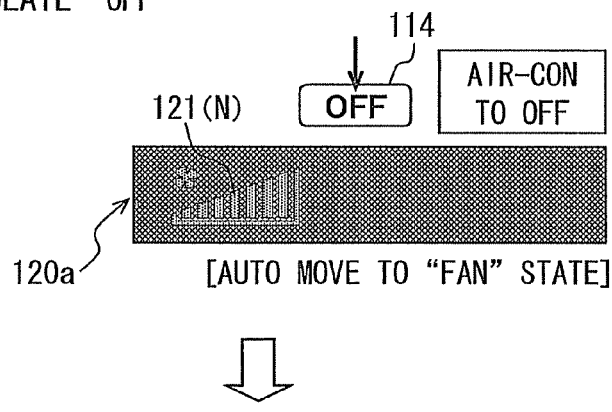
Figure 10B:
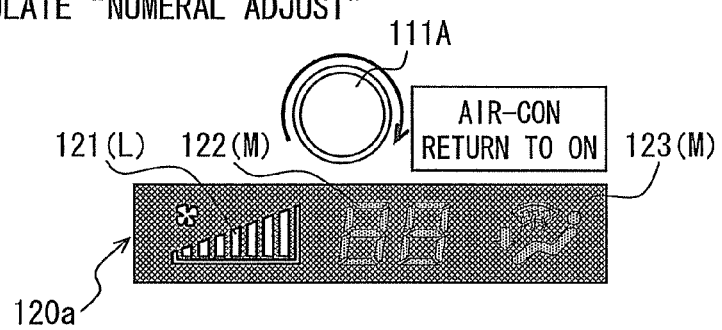
Figure 10C:
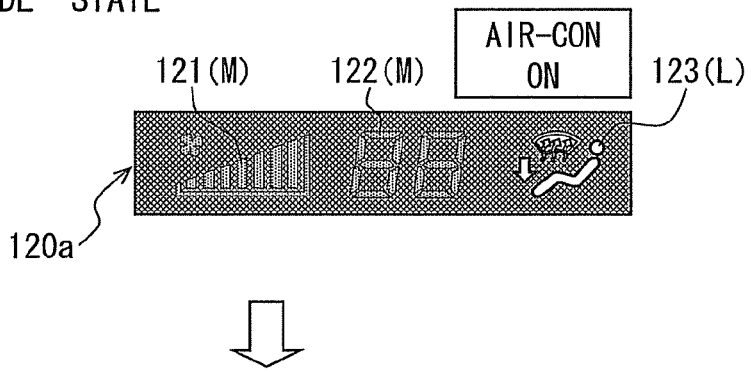
Figure 10C:
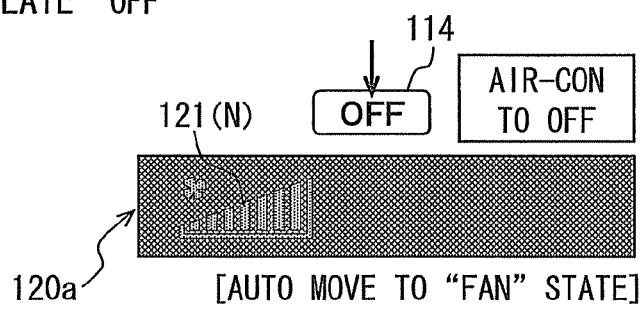
Figure 10C:
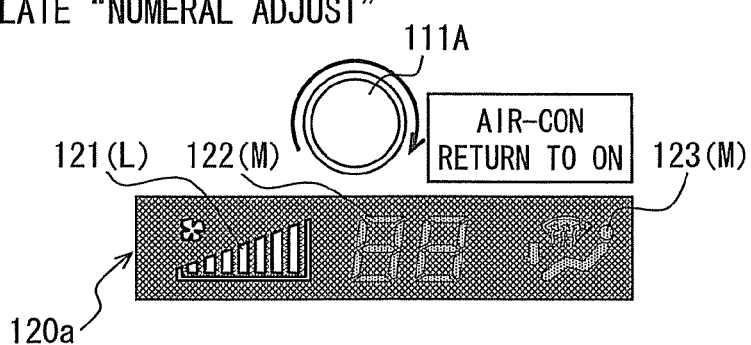

Furthermore, FIG. 10A illustrates the case that during the air quantity setup parameter (fan function) being designated, the OFF mode is designated. FIG. 10B illustrates the case that during the air temperature setup control parameter (temperature adjustment function) being designated, the OFF mode is designated. FIG. 10C illustrates the case that during the air blowoff outlet setup control parameter (mode selection function) being designated, the OFF mode is designated. In any case of the above three cases, after switching into the OFF mode, the change target control parameter is forcibly or automatically (i.e., is enforced to be) assigned to the aim control parameter (i.e., the air quantity setup parameter at the present instance), which can cancel the OFF mode and the setup content of which the user tends to change during the OFF mode being designated. Therefore, after transferring to the OFF mode, if a rotation manipulating action is applied to the multifunctional manipulating device 111, the OFF mode is cancelled while the manual mode is designated immediately, thereby eliminating the conventional two steps of manipulating actions.

The embodiment of the present invention is explained in the above; however, such an embodiment is only one example. The present invention need not be limited to the above embodiment, and can be varied in various manners unless deviating from the scope of the claims.

Figure 11A:
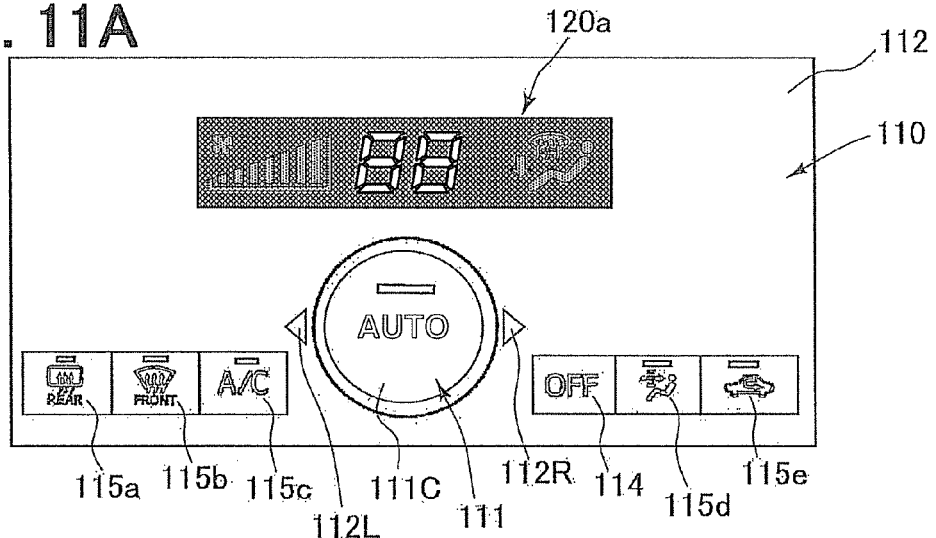
FIGS. 11A to 11C are diagrams for explaining a manipulating action substituted with a slide manipulating action of the multifunctional manipulating device of FIG. 3.
Figure 11B:
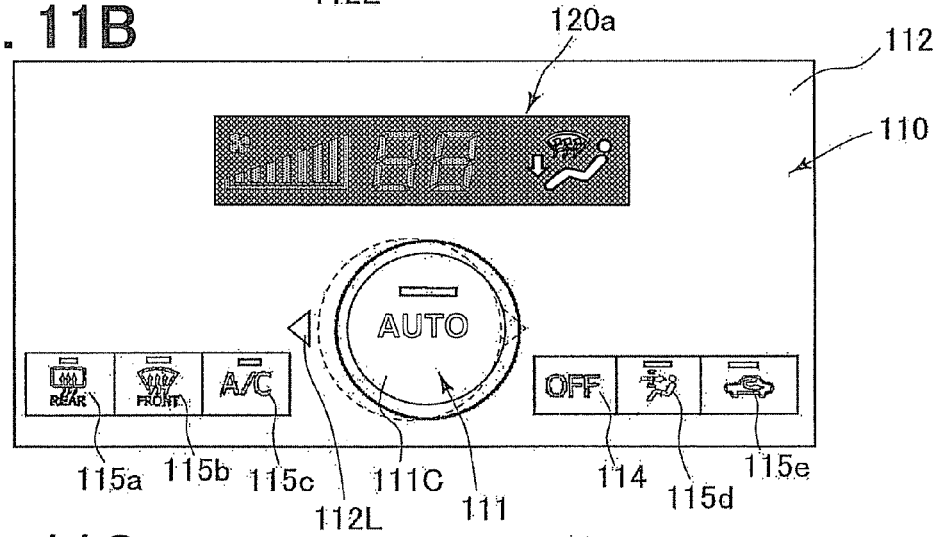
Figure 11C:
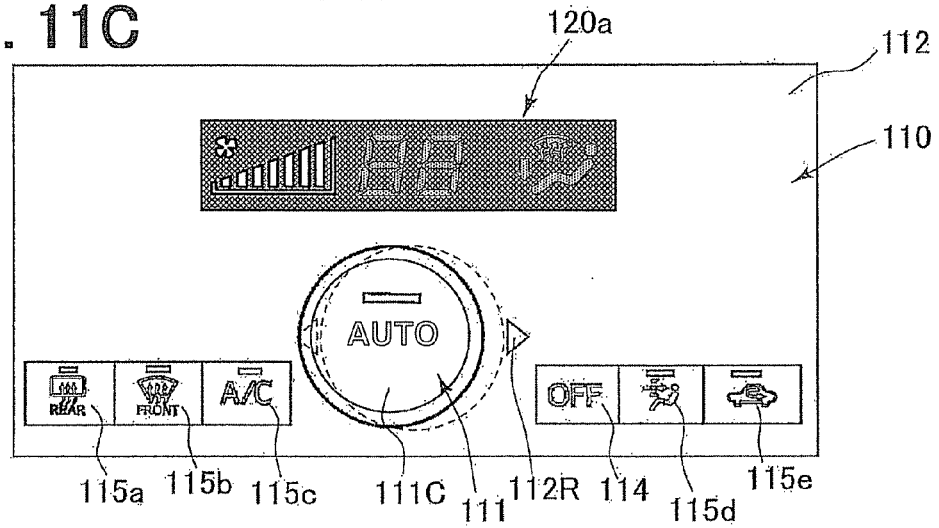

For instance, in the above embodiment, the multifunctional manipulating device 111 has a manipulating device to enable three manipulating actions of (i) a rotation manipulating action to rotate around a manipulation axis, (ii) a tilt manipulating action to tilt the manipulation axis, and (iii) a press manipulating action in the direction of the manipulation axis. Without need to be limited thereto, another manipulating action can be achieved. For example, as illustrated in FIGS. 11A to 11C, instead of the tilt manipulating action, a slide manipulating action in forward and backward directions may be included as a displacement manipulating action.

Figure 12:
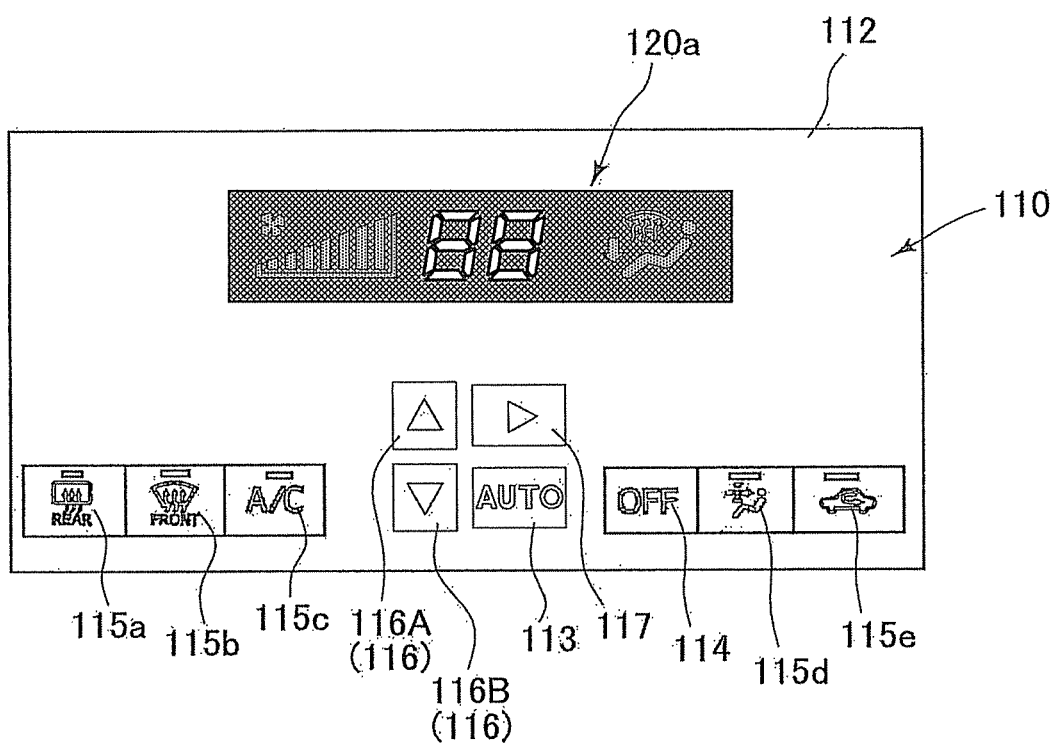
FIG. 12 is a front view of another manipulation panel with a manipulating device substituted for the multifunctional manipulating device of FIG. 3.

In addition, the multifunctional manipulating device 111 of the above embodiment is not necessarily provided. As illustrated in FIG. 12, instead of providing the multifunctional manipulating device 111, the manipulation panel 110 can have mutually independent manipulating devices of (i) a setup changeover manipulating device 116 and (ii) a target parameter switchover manipulating device 117 to execute switchover to select one of the several control parameters as the change target control parameter. In FIG. 12, the switchover order is predetermined with respect to the three control parameters of the air-conditioning apparatus 200 including a temperature setup parameter for an air-conditioning air flow, an air quantity setup parameter, and a blowoff air outlet setup parameter. Each time the target parameter switchover manipulating device 117 is manipulated, the above control parameters are switched therebetween according to the switchover order. The two elements 116A, 116B of the setup switchover manipulating device 116 are provided to enable the manipulation to move in mutually opposite forward and backward directions. The element 116A and element 116B are arranged independently as a forward direction manipulating element and a backward direction manipulating element, respectively, on the manipulation panel 110. In addition, an automatic switch is arranged independently on the manipulation panel 110 as a manipulating device 113 other than the manipulating devices 116A, 116B, and 117.

Further, in the above embodiment, the various manipulating devices (111A, 111B, 111C, 114,115, etc) of the in-vehicle apparatus device are integrated into the display device 120 as an all-in-one unit. However, the manipulating devices need not be integrated into the display device, but can be provided as an independent unit separated from the display device. For example, another configuration may be alternatively achieved so as to contain a display device and a remote manipulating device arranged near the seat, or to contain a display device and a remote controller for replacing the various manipulating devices of the above embodiment.

Further, the display device 120 may be a liquid crystal display unit (dot/segment), a fluorescent display tube, or an indicator using several LEDs, without need to be limited to one method.

In addition, in the display device 120, the highlighted state is used to distinguish, for instance, selectable function versus unselectable function, operable state versus inoperable state. In this respect, as long as the difference can be recognized, any manner can be adopted. That is, any manner other than the highlighting manner used in the above embodiment can be adopted for the following cases: During the automatic mode or manual mode, the display of the control parameter designated as a change target control parameter (i.e., the display of the selectable function) needs to be highlighted compared with the display of the remaining control parameters (unselectable function); and During the OFF mode, the display of the control parameter designated as a change target control parameter (i.e., the display of the operable state) needs to be highlighted compared with the display of the remaining control parameters (inoperable state):

In addition, the above embodiment provides an example where the in-vehicle apparatus device is an air-conditioning apparatus 200; however, another in-vehicle apparatus may be used as an example. For example, when applying the input manipulation apparatus of the present invention to an audio apparatus, the following in-vehicle audio system can be exemplified. An input manipulation apparatus for the in-vehicle audio system can include a target parameter switchover manipulating device and a setup changeover manipulating device. That is, in order to change a volume setup and select a song to be played in the audio apparatus, the target parameter switchover manipulating device is used to execute switchover to selectively designate as, a change target control parameter one of the volume setup parameter and song selection parameter. The setup changeover manipulating device is used to change the setup content of the presently designated change target control parameter. It may be designed that the audio apparatus has an automatic mode in which songs are reproduced or played in a previously registered songs switchover order and at a predetermined audio volume. During the automatic mode being designated, when a volume adjustment manipulating action is made manually, the volume is adjusted while the automatic mode is maintained. In contrast, when the song selection manipulating action is made, the automatic mode is canceled and the selected song is then reproduced. Thus, the following may be configured to prevent the automatic mode from being cancelled because of mis-manipulation. That is, in cases that a manipulating action to designate the automatic mode is made, the change target control parameter is forcibly assigned to the volume setup parameter.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer. Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, a vehicular input manipulation apparatus is provided in a vehicle for changing a setup content of one of a plurality of control parameters for driving an in-vehicle apparatus. The input manipulating apparatus is provided as follows. A target parameter switchover manipulating device is included to execute switchover to designate one of the control parameters of the in-vehicle apparatus as a change target control parameter whose setup content is to be changed. A setup changeover manipulating device is included to change the setup content of the change target control parameter. A mode switchover manipulating device is included to execute switchover to designate, as a target control mode of the in-vehicle apparatus, a predetermined control mode included in a plurality of control modes. A target parameter enforcement switching section is configured to enforce switchover relative to the change target control parameter by automatically replacing the control parameter designated as the change target control parameter with an enforcement change target control parameter at a time when the predetermined control mode is designated as the target control mode. Herein, the enforcement change target control parameter is a predetermined control parameter associated with the predetermined control mode.

As an optional aspect of the above input manipulation apparatus, the predetermined control mode of the in-vehicle apparatus may be an automatic mode having control parameters containing an aim control parameter and at least one remaining control parameter other than the aim control parameter; in the automatic mode, a setup content of the remaining control parameter may be automatically designated using an arithmetic process based on the designated setup content of the aim control parameter; and the aim control parameter may be defined as the enforcement change target control parameter.

Such a configuration enables a user to preferentially change an aim control parameter (i.e., control aim value) of the automatic control executed by the in-vehicle apparatus during the automatic mode by defining the aim control parameter as the enforcement control parameter. Thereby, at the time of the automatic mode, when the setup changeover manipulating device is manipulated, the aim control parameter with the highest manipulation priority of the user can be changed immediately. There is no necessity of executing the two steps of manipulating actions of selection manipulating action and change manipulating action.

In the above optional aspect of the input manipulation apparatus, an automatic mode canceling section may be configured to cancel the automatic mode when the setup changeover manipulating device is manipulated in a state where the remaining control parameter is designated as the change target control parameter during the automatic mode being designated.

Thus, the automatic mode can be cancelled. In this regard, however, completing of the cancellation of the automatic mode requires the two steps of manipulating actions of the selection manipulation, which selects the remaining control parameter, and the change manipulation, which changes the setup content. Accordingly, a possibility to mistakenly cancel the automatic mode may be low.

In the above optional aspect of the input manipulation apparatus, the in-vehicle apparatus may be an air-conditioning apparatus; an air-conditioning air temperature setup parameter included in a plurality of control parameters may be defined as the aim control parameter in the automatic mode; and in the automatic control mode, a setup content of an air-conditioning air quantity setup parameter and a setup content of a blowoff outlet setup parameter may be automatically designated using the arithmetic process based on a setup content of the air-conditioning air temperature setup parameter and a detection result of an air-conditioning sensor included in the air-conditioning apparatus.

Thus, when the automatic mode is designated in the in-vehicle air-conditioning apparatus (i.e., car air-conditioner), the change target for the manipulation of the setup changeover manipulating device is forcibly assigned to the blowoff air temperature setup. The manipulation executed most preferentially by the user who selected the automatic mode is adjustment of a blowoff air temperature; thus, the manipulation having the top priority can be completed by only one step of manipulating action. In addition, a mistake occurring when intending to execute a manipulating action to adjust a setup temperature can be reduced; the mistake may be cancellation of the automatic mode or unintended manipulation.

As an optional aspect of the input manipulation apparatus, the predetermined control mode may be an OFF mode which causes the in-vehicle apparatus to be in a predetermined standby state; the control parameters may include an OFF mode cancellation-functioned control parameter, which causes the OFF mode to be cancelled at a time when a setup content of the OFF mode cancellation-functioned control parameter is changed during the OFF mode being designated; an OFF mode canceling section may be configured to cancel the OFF mode and return the in-vehicle apparatus to a drive state at a time when the setup changeover manipulating device is manipulated in a state where the OFF mode cancellation-functioned control parameter is designated as the change target control parameter; and the OFF mode cancellation-functioned control parameter may be defined as the enforcement change target control parameter.

In such a configuration, the OFF mode cancellation-functioned control parameter is defined as an enforcement change target control parameter so that a changeover manipulation to the OFF mode cancellation-functioned control parameter can be preferentially made by the user. During the OFF mode, the highest manipulation priority by the user is given to a control parameter for canceling the OFF mode to thereby re-driving the in-vehicle apparatus compared with other control parameters. Accordingly, at the time of the OFF mode, when the setup changeover manipulating device is manipulated, the OFF mode cancellation manipulation/re-driving manipulation with the highest manipulation priority by the user can be achieved by the one step of manipulating action. Manipulability can be thus improved. It is noted that the standby state can be defined as a control mode at least providing an average power consumption lower than that of the automatic mode or manual mode.

In the optional aspect of the above input manipulation apparatus, a setup changeover restricting section may be configured to prohibit changeover of a setup content of at least one remaining control parameter in conjunction with a manipulating action by the setup changeover manipulating device during the OFF mode being designated. Herein, the at least one remaining control parameter may be included in the control parameters excluding the OFF mode cancellation-functioned control parameter.

The in-vehicle apparatus is in the above standby state at the time of the OFF mode, there is no meaning in changing the setup content of the control parameter basically. Therefore, the useless manipulation and mis-manipulation at the time of the OFF mode can be prevented by having the above configuration.

In the optional aspect of the above input manipulation apparatus, the in-vehicle apparatus may be an in-vehicle air-conditioning apparatus; and an air-conditioning air quantity setup parameter may be defined as the enforcement change target control parameter.

When the OFF mode is designated in the in-vehicle air-conditioning apparatus (i.e., car air-conditioner), the change target for the manipulation of the setup changeover manipulating device is forcibly assigned to the blowoff air quantity setup. The manipulation executed with the top priority by the user who selected the OFF mode executes is re-driving of the in-vehicle air-conditioning apparatus (i.e., cancellation of the OFF mode). The air quantity setup manipulation, which also serves as the re-driving manipulation, with the top priority can be achieved by the one step of manipulating action.

As an optional aspect of the input manipulation apparatus, the setup changeover manipulating device may include a function of the target parameter switchover manipulating device, which designates one of the control parameters as the change target control parameter, as a different manipulating action to change a setup content of the change target control parameter.

That is, the setup changeover manipulating device is further provided to have a function of the target parameter switchover manipulating device. In such a configuration, the number of the manipulating devices is reducible while the arrangement space of the switch on the manipulation panel of the in-vehicle apparatus device can be reduced, thereby contributing to multi-functionalization of the input manipulation apparatus.

As an optional aspect of the input manipulation apparatus, the setup switchover manipulating device may be a bi-directional manipulating device, which is enabled to perform a manipulating action in mutually opposite forward and backward directions.

The changeover manipulating action in two forward and backward directions can be thus attained; the manipulability can be improved in respect of changing the setup content according to the predetermined switchover order.

In the optional aspect of the above input manipulation apparatus, the bi-directional manipulating device may be a dial manipulating device which is allowed to rotate around a predetermined rotation axis intersecting with a front surface of a manipulation body of the input manipulation apparatus.

As an optional aspect of the input manipulation apparatus, a dial manipulating device may be included to have functions of the setup changeover manipulating device and the target parameter switchover manipulating device. The dial manipulating device has a function of a bi-directional manipulating device to perform a manipulating action in mutually opposite forward and backward directions. The dial manipulating device is allowed to perform a rotation manipulating action to rotate around a predetermined rotation axis intersecting with a front surface of a manipulation body of the input manipulation apparatus. The dial manipulating device is further allowed to perform a displacement manipulating action to displace the rotation axis to one of predetermined several directions from a neutral position. Herein, at a time when the displacement manipulating action exceeding a predetermined displacement value is made to one of the predetermined directions, the function of the target parameter switchover manipulating device of the dial manipulating device executes changeover to replace the control parameter being designated as the change target control parameter with a control parameter associated with the one of the predetermined directions.

Under such a configuration, the dial manipulating device can receive a displacement manipulating action as well as a rotation manipulating action. Herein, the selection manipulation to select or designate a control parameter as a change target may be assigned to the displacement manipulation; the changeover manipulation to change a setup content of the control parameter designated as the change target may be assigned to the rotation manipulation. This can achieve a manipulating device to provide improved manipulability and reduce an arrangement space.

In the optional aspect of the above input manipulation apparatus, the displacement manipulating action by the dial manipulating device may be a slide manipulating action to slide the rotation axis to one of the predetermined directions, or a tilt manipulating action to tilt the rotation axis to one of the predetermined directions.

With respect to the dial knob or handle, the displacement manipulating action is very different from the rotation manipulating action, thereby helping prevent mis-manipulation therebetween.

As an optional aspect of the input manipulation apparatus, the setup changeover manipulating device and the target parameter switchover manipulating device may be arranged at a front surface of a manipulation body. The input manipulating apparatus may further comprise: a setup display device that displays a setup content of each of the control parameters in a proximity of the setup changeover manipulating device in the front surface of the manipulation body; and a target parameter indication device configured to visually indicate a control parameter designated as the change target control parameter in a proximity of the target parameter switchover manipulating device in the front surface of the manipulation body.

Such a configuration enables a user to visually recognize respective designated states of the several control parameters more accurately. In addition, the user can visually recognize the control parameters of which setup contents are allowed to be changed, thereby helping prevent the occurrence of the mis-manipulation.

In the optional aspect of the above input manipulation apparatus, the target parameter indication device may be further configured to indicate the setup content of the control parameter designated as the change target control parameter in a highlighted state compared with a setup content of at least one remaining control parameter other than the control parameter designated as the change target control parameter among the setup contents of the control parameters displayed by the setup display device.

Under such a configuration, the user can visually recognize a control parameter of which setup content is allowed to be changed at the present time in the single display window which displays respective designated states of the several control parameters, thereby reducing costs.

It will be obvious to those skilled in the art that various changes may be made in the above-described embodiments of the present invention. However, the scope of the present invention should be determined by the following claims.

The invention claimed is:

1. A vehicular input manipulation apparatus in a vehicle for changing a setup content of one of a plurality of control parameters under one of a plurality of control modes for driving an in-vehicle air-conditioning apparatus, the input manipulating apparatus comprising:
a mode switchover manipulating device that executes switchover to designate, as a target control mode of the air-conditioning apparatus, one of the control modes, which includes an OFF mode that causes the air-conditioning apparatus to be in a predetermined standby state;
a target parameter switchover manipulating device that executes switchover to designate one of the control parameters of the air-conditioning apparatus under one of the control modes as a change target control parameter whose setup content is to be changed; and a setup changeover manipulating device that changes the setup content of the change target control parameter, the vehicle input manipulation apparatus characterized by comprising:

a target parameter enforcement switching section configured to enforce switchover relative to the change target control parameter by automatically substituting an enforcement change target control parameter at a time when a predetermined control mode is designated as the target control mode, the target parameter enforcement switching section being further configured, at a time when the setup changeover manipulating device is manipulated in a state where the OFF mode is being designated as the target control mode, to forcibly designate an air-conditioner air quantity setup parameter being the enforcement target control parameter of the air-conditioning apparatus, replacing the OFF mode with an other predetermined control mode, where the air-conditioning apparatus is returned from the standby state to a drive state while the air-conditioner air quantity setup parameter is designated as the change target control parameter.

2. The vehicular input manipulation apparatus according to claim 1, wherein:

at the time when the setup changeover manipulating device is manipulated under the OFF mode substituted for a previous control mode under which a first control parameter was designated as the change target control parameter, the air-conditioner air quantity setup parameter is forcibly designated by the target parameter enforcement switching section as the change target control parameter, regardless of which of one of the control parameters the first control parameter is.

3. The vehicular input manipulation apparatus according to claim 1, wherein:

the control modes further includes an automatic mode having control parameters containing an air-conditioning air temperature setup parameter serving as an aim control parameter and two of an air-conditioning air quantity setup parameter and a blowoff outlet setup parameter serving as at least two remaining control parameters other than the aim control parameter; and in the automatic mode, a setup content of each of the remaining control parameters is automatically designated using an arithmetic process based on the designated setup content of the aim control parameter and a detection result of an air-conditioning sensor included in the air-conditioning apparatus, the target parameter enforcement switching section being further configured to forcibly designate as the change target control parameter the air-conditioning air temperature setup parameter serving as the enforcement target control parameter at a time when the automatic mode is designated as the target control mode.

4. The vehicular input manipulation apparatus according to claim 3, further comprising:

an automatic mode canceling section configured to cancel the automatic mode when the setup changeover manipulating device is manipulated in a state where one of the remaining control parameters is designated as the change target control parameter during the automatic mode being designated.

5. The vehicular input manipulation apparatus according to claim 1, further comprising:

a setup changeover restricting section configured to prohibit changeover of a setup content of at least one remaining control parameter in conjunction with a manipulating action by the setup changeover manipulating device during the OFF mode being designated, the at least one remaining control parameter being included in the control parameters excluding the air-conditioning air quantity control parameter.

6. The vehicular input manipulation apparatus according to claim 1, wherein:

the setup changeover manipulating device includes a function of the target parameter switchover manipulating device, which designates one of the control parameters as the change target control parameter, as a different manipulating action to change a setup content of the change target control parameter.

7. The vehicular input manipulation apparatus according to claim 1, wherein:

the setup switchover manipulating device is a bi-directional manipulating device, which is enabled to perform a manipulating action in mutually opposite forward and backward directions.

8. The vehicular input manipulation apparatus according to claim 7, wherein:

the bi-directional manipulating device is a dial manipulating device which is allowed to rotate around a predetermined rotation axis intersecting with a front surface of a manipulation body of the input manipulation apparatus.

9. The vehicular input manipulation apparatus according to claim 8, wherein:

the dial manipulating device is further allowed to perform a displacement manipulating action to displace the rotation axis to one of predetermined several directions from a neutral position; and the displacement manipulating action by the dial manipulating device is a slide manipulating action to slide the rotation axis to one of the predetermined directions, or a tilt manipulating action to tilt the rotation axis to one of the predetermined directions.

10. The vehicular input manipulation apparatus according to claim 1, further comprising:

a dial manipulating device that includes functions of the setup changeover manipulating device and the target parameter switchover manipulating device, the dial manipulating device further having a function of a bi-directional manipulating device to perform a manipulating action in mutually opposite forward and backward directions, the dial manipulating device being allowed to perform a rotation manipulating action to rotate around a predetermined rotation axis intersecting with a front surface of a manipulation body of the input manipulation apparatus, the dial manipulating device being further allowed to perform a displacement manipulating action to displace the rotation axis to one of predetermined several directions from a neutral position, wherein at a time when the displacement manipulating action exceeding a predetermined displacement value is made to one of the predetermined directions, the function of the target parameter switchover manipulating device of the dial manipulating device executes switchover to replace the control parameter being designated as the change target control parameter with a control parameter associated with the one of the predetermined directions.

11. The vehicular input manipulation apparatus according to claim 10, wherein:
the displacement manipulating action by the dial manipulating device is
a slide manipulating action to slide the rotation axis to one of the predetermined directions, or
a tilt manipulating action to tilt the rotation axis to one of the predetermined directions.

12. The vehicular input manipulation apparatus according to claim 1, wherein:
the setup changeover manipulating device and the target parameter switchover manipulating device are arranged at a front surface of a manipulation body,
the input manipulating apparatus further comprising:
a setup display device that displays a setup content of each of the control parameters in a proximity of the setup changeover manipulating device in the front surface of the manipulation body; and
a target parameter indication device that visually indicates a control parameter designated as the change target control parameter in a proximity of the target parameter switchover manipulating device in the front surface of the manipulation body.

13. The vehicular input manipulation apparatus according to claim 12,
the target parameter indication device being further configured to indicate the setup content of the control parameter designated as the change target control parameter in a highlighted state compared with a setup content of at least one remaining control parameter other than the control parameter designated as the change target control parameter among the setup contents of the control parameters displayed by the setup display device.

14. A method used in a vehicular input manipulating apparatus for changing a setup content of one of a plurality of control parameters under one of a plurality of control modes for driving an in-vehicle air-conditioning apparatus,
the method comprising:
executing switchover to designate, as a target control mode of the air-conditioning apparatus, one of the control modes, which includes an OFF mode that causes the air-conditioning apparatus to be in a predetermined standby state; and
executing switchover to designate one of the control parameters of the air-conditioning apparatus under one of the control modes as a change target control parameter whose setup content is to be changed using a setup changeover manipulating device,
the method characterized by comprising:
executing a determination as to whether the OFF mode being designated as the target control mode is cancelled, based on a manipulation applied to the setup changeover manipulating device; and
enforcing, when the determination is affirmatively made, switchover relative to the change target control parameter by automatically designating an air-conditioner air quantity setup parameter of the air-conditioning apparatus to replace the OFF mode with an other predetermined control mode, where the air-conditioning apparatus is returned to a drive state while the air-conditioner air quantity setup parameter is designated as the change target control parameter.

15. A vehicular input manipulation apparatus in a vehicle for changing a setup content of one of a plurality of control parameters under one of a plurality of control modes for driving an in-vehicle air-conditioning apparatus, the input manipulating apparatus comprising:
a mode switchover manipulating device that executes switchover to designate, as a target control mode of the air-conditioning apparatus, one of the control modes;
a target parameter switchover manipulating device that executes switchover to designate one of the control parameters of the air-conditioning apparatus under one of the control modes as a change target control parameter whose setup content is to be changed;
a setup changeover manipulating device that changes the setup content of the change target control parameter,
wherein the control modes includes an automatic mode having control parameters containing an air-conditioning air temperature setup parameter serving as an aim control parameter and two of an air-conditioning air quantity setup parameter and a blowoff outlet setup parameter serving as at least two remaining control parameters other than the aim control parameter,
wherein in the automatic mode, a setup content of each of the remaining control parameters is automatically designated using an arithmetic process based on the designated setup content of the aim control parameter and a detection result of an air-conditioning sensor included in the air-conditioning apparatus,
the vehicle input manipulation apparatus characterized by comprising:
a target parameter enforcement switching section configured to enforce switchover relative to the change target control parameter by automatically replacing a previous control parameter, which has been designated as the change target control parameter, with an enforcement change target control parameter at a time when a predetermined control mode is designated as the target control mode,
the target parameter enforcement switching section being further configured,
at a time when the automatic mode is designated as the target control mode,
to forcibly designate as the change target control parameter the air-conditioning air temperature setup parameter being the enforcement target control parameter.

16. The vehicular input manipulation apparatus according to claim 15, wherein:
at the time when the automatic mode is designated by replacing a previous control mode in which the previous control parameter was designated as the change target control parameter,
the air-conditioning air temperature setup parameter being the enforcement target control parameter is forcibly designated by the target parameter enforcement switching section as the change target control parameter, regardless of which of one of the control parameters the previous control parameter was.

17. The vehicular input manipulation apparatus according to claim 15, further comprising:
an automatic mode canceling section configured to cancel the automatic mode when the setup changeover manipulating device is manipulated in a state where one of the remaining control parameters is designated as the change target control parameter during the automatic mode being designated.

18. The vehicular input manipulation apparatus according to claim 15, wherein:

the control modes further includes an OFF mode which causes the air-conditioning apparatus to be in a predetermined standby state, the target parameter enforcement switching section being further configured, at a time when the setup changeover manipulating device is manipulated in a state where the OFF mode is being designated as the target control mode, to forcibly designate an air-conditioner air quantity setup parameter being the enforcement target control parameter of the air-conditioning apparatus, replacing the OFF mode with an other predetermined control mode, where the air-conditioning apparatus is returned from the standby state to a drive state while the air-conditioner air quantity setup parameter is designated as the change target control parameter.

19. The vehicular input manipulation apparatus according to claim 18, further comprising:

a setup changeover restricting section configured to prohibit changeover of a setup content of at least one remaining control parameter in conjunction with a manipulating action by the setup changeover manipulating device during the OFF mode being designated, the at least one remaining control parameter being included in the control parameters excluding the air-conditioning air quantity control parameter.

20. The vehicular input manipulation apparatus according to claim 15, wherein:

the setup changeover manipulating device includes a function of the target parameter switchover manipulating device, which designates one of the control parameters as the change target control parameter, as a different manipulating action to change a setup content of the change target control parameter.

21. The vehicular input manipulation apparatus according to claim 15, wherein:

the setup switchover manipulating device is a bi-directional manipulating device, which is enabled to perform a manipulating action in mutually opposite forward and backward directions.

22. The vehicular input manipulation apparatus according to claim 21, wherein:

the bi-directional manipulating device is a dial manipulating device which is allowed to rotate around a predetermined rotation axis intersecting with a front surface of a manipulation body of the input manipulation apparatus.

23. The vehicular input manipulation apparatus according to claim 22, wherein:

the dial manipulating device is further allowed to perform a displacement manipulating action to displace the rotation axis to one of predetermined several directions from a neutral position; and the displacement manipulating action by the dial manipulating device is a slide manipulating action to slide the rotation axis to one of the predetermined directions, or a tilt manipulating action to tilt the rotation axis to one of the predetermined directions.

24. The vehicular input manipulation apparatus according to claim 15, further comprising:

a dial manipulating device that includes functions of the setup changeover manipulating device and the target parameter switchover manipulating device, the dial manipulating device further having a function of a bi-directional manipulating device to perform a manipulating action in mutually opposite forward and backward directions, the dial manipulating device being allowed to perform a rotation manipulating action to rotate around a predetermined rotation axis intersecting with a front surface of a manipulation body of the input manipulation apparatus, the dial manipulating device being further allowed to perform a displacement manipulating action to displace the rotation axis to one of predetermined several directions from a neutral position, wherein at a time when the displacement manipulating action exceeding a predetermined displacement value is made to one of the predetermined directions, the function of the target parameter switchover manipulating device of the dial manipulating device executes switchover to replace the control parameter being designated as the change target control parameter with a control parameter associated with the one of the predetermined directions.

25. The vehicular input manipulation apparatus according to claim 24, wherein:

the displacement manipulating action by the dial manipulating device is a slide manipulating action to slide the rotation axis to one of the predetermined directions, or a tilt manipulating action to tilt the rotation axis to one of the predetermined directions.

26. The vehicular input manipulation apparatus according to claim 15, wherein:

the setup changeover manipulating device and the target parameter switchover manipulating device are arranged at a front surface of a manipulation body, the input manipulating apparatus further comprising:

a setup display device that displays a setup content of each of the control parameters in a proximity of the setup changeover manipulating device in the front surface of the manipulation body; and a target parameter indication device that visually indicates a control parameter designated as the change target control parameter in a proximity of the target parameter switchover manipulating device in the front surface of the manipulation body.

27. The vehicular input manipulation apparatus according to claim 26, the target parameter indication device being further configured to indicate the setup content of the control parameter designated as the change target control parameter in a highlighted state compared with a setup content of at least one remaining control parameter other than the control parameter designated as the change target control parameter among the setup contents of the control parameters displayed by the setup display device.

28. A method used in a vehicular input manipulating apparatus for changing a setup content of one of a plurality of control parameters under one of a plurality of control modes for driving an in-vehicle air-conditioning apparatus, the method comprising:

executing switchover to designate, as a target control mode of the air-conditioning apparatus, one of the control modes; and executing switchover to designate one of the control parameters of the air-conditioning apparatus under one of the control modes as a change target control parameter whose setup content is to be changed, wherein the control modes includes an automatic mode having control parameters containing an air-conditioning air temperature setup parameter serving as an aim control parameter and two of an air-conditioning air quantity setup parameter and a blowoff outlet setup parameter serving as at least two remaining control parameters other than the aim control parameter, wherein in the automatic mode, a setup content of each of the remaining control parameters is automatically designated using an arithmetic process based on the designated setup content of the aim control parameter and a detection result of an air-conditioning sensor included in the air-conditioning apparatus, the method characterized by comprising:

executing a determination as to whether the designated target control mode is the automatic mode of the air-conditioning apparatus; and enforcing, when the determination is affirmatively made, switchover relative to the change target control parameter, by automatically replacing a previous control parameter, which has been designated as the change target control parameter, with air-conditioning air temperature setup parameter serving as an enforcement change target control parameter being associated with the automatic mode.

* * * * *